US012749899B2

(12) United States Patent
Yamane et al.

(10) Patent No.: US 12,749,899 B2

(45) Date of Patent: Sep. 29, 2026

(54) DISTRIBUTED-POWER-SOURCE CONTROL SYSTEM

(71) Applicant: Mitsubishi Electric Corporation, Tokyo (JP)

(72) Inventors: Keisuke Yamane, Tokyo (JP); Tomonosuke Mori, Tokyo (JP); Kazuhiro Yasunami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 18/713,425

(22) PCT Filed: Jan. 31, 2022

(86) PCT No.: PCT/JP2022/003598

§ 371 (c)(1),
(2) Date: May 24, 2024

(87) PCT Pub. No.: WO2023/145069

PCT Pub. Date: Aug. 3, 2023

(65) Prior Publication Data

US 2025/0038537 A1 Jan. 30, 2025

(51) Int. Cl.
*H02J 3/00* (2026.01)
*H02J 3/0014* (2026.01)
(Continued)

(52) U.S. Cl.
CPC ............ *H02J 3/38* (2013.01); *H02J 3/00142* (2026.01); *H02J 3/18* (2013.01); *H02J 13/12* (2026.01); *H02J 2103/30* (2026.01)

(58) Field of Classification Search
CPC .. H02J 3/38; H02J 3/00142; H02J 3/18; H02J 13/12; H02J 2103/30; H02J 3/00;
(Continued)

(56) References Cited

U.S. PATENT DOCUMENTS

2012/0035775 A1* 2/2012 Garcia .................. F03D 7/0284 290/44
2012/0203384 A1* 8/2012 Arlaban Gabeiras ..... H02J 3/06 700/286
(Continued)

FOREIGN PATENT DOCUMENTS

JP 2013-153648 A 8/2013
JP 2015-076907 A 4/2015
JP 2019-003454 A 1/2019

OTHER PUBLICATIONS

International Search Report and Written Opinion mailed on Apr. 12, 2022, received for PCT Application PCT/JP2022/003598, filed on Jan. 31, 2022, 8 pages including English Translation.

*Primary Examiner* — Aleksey Olshannikov
(74) *Attorney, Agent, or Firm* — XSENSUS LLP

(57) ABSTRACT

An object of the present disclosure is to control active power of a distributed power source at high speed in a distributed-power-source control system. A central operation unit includes an f-change-rate control parameter operation unit that calculates an f-change-rate control parameter from a simulation result of a response operation unit. A distributed-power-source control apparatus includes an f-change-rate measurement unit that measures an f change rate of an own terminal, an f-change-rate controlled variable operation unit that sets, as an f-change-rate controlled variable, active power corresponding to the f change rate of the own terminal in the f-change-rate control parameter, and a power converter that controls active power output from the distributed power source to a transmission and distribution system, based on an active power controlled variable determined based on the f-change-rate controlled variable.

12 Claims, 20 Drawing Sheets

(51) Int. Cl.

| | |
|---|---|
| ***H02J 3/18*** | (2006.01) |
| ***H02J 3/38*** | (2006.01) |
| *H02J 13/12* | (2026.01) |
| *H02J 103/30* | (2026.01) |

(58) Field of Classification Search
CPC .......... H02J 3/0014; H02J 3/381; H02J 13/00; H02J 3/32
See application file for complete search history.

(56) References Cited

U.S. PATENT DOCUMENTS

2014/0239913 A1 8/2014 Kudo et al.
2018/0120818 A1* 5/2018 Omi ...................... H02J 3/0014
2019/0380091 A1* 12/2019 Li ..................... H04W 52/0212
2019/0391609 A1* 12/2019 Kato ......................... G05F 1/66

* cited by examiner

DISTRIBUTED-POWER-SOURCE CONTROL SYSTEM

CROSS-REFERENCE TO RELATED APPLICATION

This application is a national stage application, pursuant to 35 U.S.C. § 371, of International Patent Application No. PCT/JP2022/003598, filed Jan. 31, 2022, the entire contents of which are incorporated herein by reference.

TECHNICAL FIELD

The present disclosure relates to a distributed-power-source control system.

BACKGROUND ART

In recent years, renewable energy power source is introduced. Because the renewable power source is connected to a power system through an inverter, it does not have inertia unlike a conventional synchronous generator. Accordingly, in a power system in which a large amount of renewable energy is interconnected and the number of synchronous generators decreases, there is a concern that system inertia decreases and frequency fluctuation increases. In particular, the renewable energy power source or the synchronous generator has a function of stopping operation from the viewpoint of device protection when a deviation (Δf) of a frequency from a reference value or a frequency change rate (also referred to as f change rate, df/dt, rate of change of frequency (RoCoF) is large. Accordingly, when disturbance such as large-scale power source down or a power source line route interruption accident is generated, a supply and demand balance of power greatly collapses, so that the frequency rapidly decreases, and further, when the renewable power source or the synchronous generator is disconnected, a risk of spreading to a large-scale power failure increases.

For this reason, a technique in which a decrease is reduced in frequency by utilizing a distributed power source such as a storage battery having an ability to supply active power and injecting the active power from the distributed power source into a power system during generation of disturbance has been developed. In the control using the Δf, there is a possibility that the control cannot be performed in time due to slow operation, so that the disturbance is required to be detected at a high speed by utilizing the f change rate to perform appropriate active power control.

Patent Document 1 discloses a technique of measuring the f change rate of the power system in a battery control system that controls a plurality of batteries, and allocating a discharge amount or a charge amount to each storage battery according to an operation delay time of each battery during the generation of the disturbance.

PRIOR ART DOCUMENT

Patent Document

Patent Document 1: Japanese Patent Application Laid-Open No. 2013-153648

SUMMARY

Problem to be Solved by the Invention

The battery control system described in Patent Document 1 detects a system disturbance in the battery control system that controls a plurality of batteries, and gives a control command to the storage battery through a communication network. For this reason, high-speed battery control cannot be performed, and as a result, there is a possibility that reduction of frequency decrease and avoidance of a large-scale power failure cannot be performed.

The present disclosure has been made to solve the above problems, and an object of the present disclosure is to control the active power of the distributed power source at high speed in the distributed-power-source control system.

Means to Solve the Problem

A distributed-power-source control system of the present disclosure includes a distributed-power-source control apparatus that controls output power from a distributed power source to a transmission and distribution system, and a central operation unit that sets a parameter used for control by the distributed-power-source control apparatus. The central operation unit includes a response operation unit that simulates response of the transmission and distribution system at time of generation of the disturbance in the transmission and distribution system, and an f-change-rate control parameter operation unit that obtains, from a simulation result of the response operation unit, a correspondence relation between an f change rate, which is a frequency change rate in the transmission and distribution system, and a supply power deficient amount of active power and calculates the correspondence relation between the f change rate in the transmission and distribution system and active power to be output from a distributed power source to the transmission and distribution system as an f-change-rate control parameter, based on the correspondence relation between the f change rate in the transmission and distribution system and a supply power deficient amount of the active power. The distributed-power-source control apparatus includes an f-change-rate measurement unit that measures the f change rate of an own terminal, a f-change-rate controlled variable operation unit that sets the active power corresponding to the f change rate of the own terminal in the f-change-rate control parameter as an f-change-rate controlled variable, and a power converter that controls the active power output from the distributed power source to the transmission and distribution system, based on the active power controlled variable determined based on the f-change-rate controlled variable.

Effects of the Invention

According to the distributed-power-source control system of the present disclosure, the active power of the distributed power source can be controlled at high speed by the distributed-power-source control apparatus. Objects, features, aspects, and advantages of the present disclosure will become more apparent from the following detailed description and the accompanying drawings.

DESCRIPTION OF EMBODIMENTS

A. First Embodiment

A-1. Configuration

Figure 1:
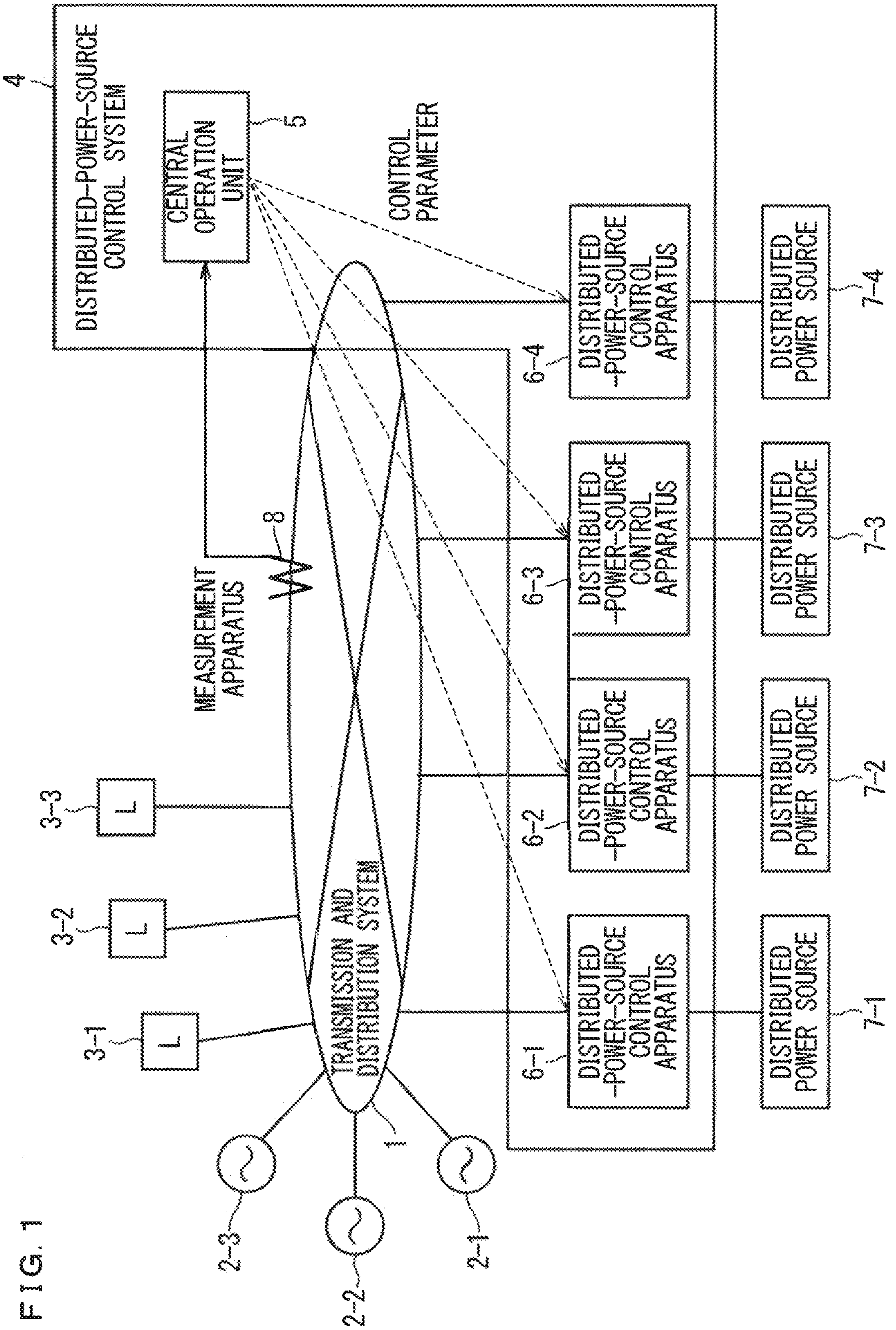
FIG. 1 is a view illustrating a configuration of a power system and a distributed-power-source control system according to a first embodiment.

FIG. 1 illustrates a configuration of a power system according to a first embodiment. The power system includes a transmission and distribution system 1, large-scale generators 2-1, 2-2, 2-3, loads 3-1, 3-2, 3-3, a distributed-power-source control system 4, distributed power sources 7-1, 7-2, 7-3, 7-4, and a measurement apparatus 8. The distributed-power-source control system 4 includes a central operation unit 5 and distributed-power-source control apparatuses 6-1, 6-2, 6-3, 6-4.

Although the three large-scale generators 2-1, 2-2, 2-3 are illustrated in FIG. 1, the number of large-scale generators is not limited thereto. The same applies to the distributed-power-source control apparatuses 6-1, 6-2, 6-3, 6-4 and the distributed power sources 7-1, 7-2, 7-3, 7-4. Although one measurement apparatus 8 is illustrated in FIG. 1, a plurality of measurement apparatuses 8 may be provided in the transmission and distribution system 1. Hereinafter, the large-scale generators 2-1, 2-2, 2-3 will be referred to as a large-scale generator 2 when collectively referred without distinguishing them. In addition, the distributed-power-source control apparatuses 6-1, 6-2, 6-3, 6-4 will be referred to as a distributed-power-source control apparatus 6 when collectively referred without distinguishing them. In addition, the distributed power sources 7-1, 7-2, 7-3, 7-4 will be referred to as a distributed power source 7 when collectively referred to without distinguishing them.

The distributed power source 7 is a power source including renewable energy such as photovoltaic power generation (PV) or wind power generation or a power storage apparatus such as a storage battery.

The distributed-power-source control apparatus 6-1 is an apparatus that controls generated power of the distributed power source 7-1, and includes a power converter such as an inverter circuit that interchanges power between the distributed power source 7-1 and the transmission and distribution system 1. The distributed-power-source control apparatuses 6-2, 6-3, 6-4 are apparatuses that control the distributed power source 7-2, 7-3, 7-4, respectively, similarly to the distributed-power-source control apparatus 6-1 for the distributed power source 7-1, and include power converters such as inverter circuits that interchange power between the distributed power source 7-2, 7-3, 7-4 and the transmission and distribution system 1.

The central operation unit 5, the distributed-power-source control apparatus 6, and the measurement apparatus 8 are connected to each other through a communication network. The communication network may be the Internet, a dedicated network, or a network using both of them.

The measurement apparatus 8 measures information about the transmission and distribution system 1. The central operation unit 5 receives the measurement information about the measurement apparatus 8 through the communication network, and grasps a situation of the transmission and distribution system 1 and performs various calculations using the measurement information. In addition, the central operation unit 5 sets a parameter used for power control of the distributed power source 7 performed by the distributed-power-source control apparatus 6, and transmits the parameter to the distributed-power-source control apparatus 6 through the communication network. In addition, the central operation unit 5 receives a driving state of the distributed power source 7 from the distributed-power-source control apparatus 6 through the communication network. For example, the driving state of the distributed power source 7 includes facility capacity or current output, and includes charged electric power when the distributed power source 7 has storage capacity.

Figure 2:
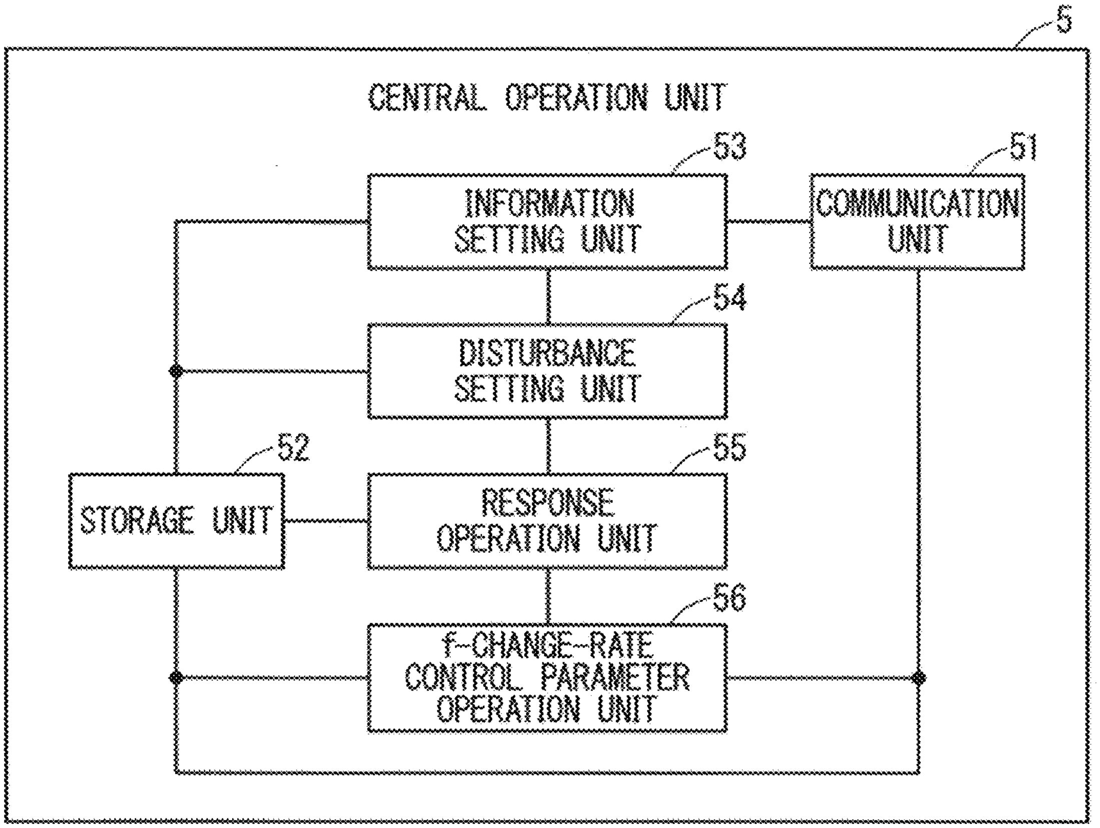
FIG. 2 is a view illustrating a configuration of a central operation unit of the first embodiment.

FIG. 2 is a block diagram illustrating a configuration of the central operation unit 5 in the first embodiment. The central operation unit 5 includes a communication unit 51, a storage unit 52, an information setting unit 53, a disturbance setting unit 54, a response operation unit 55, and an f-change-rate control parameter operation unit 56.

The communication unit 51 communicates with the measurement apparatus 8 and the distributed-power-source control apparatus 6 through the communication network. The communication unit 51 receives the information about the transmission and distribution system 1 measured by the measurement apparatus 8. At this point, the information about the transmission and distribution system 1 includes at least one of the driving state of the large-scale generator 2, the load 3, a voltage flow state, and a power flow state. In addition, the communication unit 51 transmits a f-change-rate control parameter, which is a parameter of the power control calculated by the f-change-rate control parameter operation unit 56, to the distributed-power-source control apparatus 6. In addition, the communication unit 51 receives the driving state of the distributed power source 7 from the distributed-power-source control apparatus 6 through the communication network.

The storage unit 52 stores facility information about the transmission and distribution system 1, measurement information about the transmission and distribution system 1 received by the communication unit 51, the driving state of the distributed power source 7, and settings and calculation results used in the information setting unit 53, the disturbance setting unit 54, the response operation unit 55, and the f-change-rate control parameter operation unit 56.

The information setting unit 53 sets the current state of the transmission and distribution system 1 based on the measurement information about the transmission and distribution system 1 received by the communication unit 51, the driving state of the distributed power source 7, and the facility information about the transmission and distribution system 1 stored in the storage unit 52.

The disturbance setting unit 54 sets at least one possible system disturbance for the current state of the transmission and distribution system 1 set by the information setting unit 53. The system disturbance includes power source down, load down, or power source line route disconnection. At this point, the power source down means that any one or a plurality of large-scale generators 2 drop off. In addition, the load down off means that any one or a plurality of loads 3 drop off. In addition, the power source line route disconnection means disconnection of a power source line that is a transmission line in which the plurality of large-scale generators 2 are interconnected and power is transmitted from the interconnected large-scale generators 2.

The response operation unit 55 simulates the response of the transmission and distribution system 1 when the system disturbance set by the disturbance setting unit 54 is generated, and aggregates the result. The response of the transmission and distribution system 1 includes a system frequency, an inertia center frequency, and a voltage and flow state at one or a plurality of points of the transmission and distribution system 1, an output of the large-scale generator 2, a change in power of the load 3, and the like when the system disturbance is generated.

From the response of the transmission and distribution system 1 simulated by the response operation unit 55, the f-change-rate control parameter operation unit 56 obtains a relationship between an f change rate, which is a time change rate of the frequency of the transmission and distribution system 1, and a supply deficient amount $\Delta P_{missmatch}$ of active power when the system disturbance is generated. In addition, based on the relationship between the f change rate and the supply deficient amount $\Delta P_{missmatch}$ of the active power, the f-change-rate control parameter operation unit 56 calculates, for each facility, the active power $P_{DER\_dfdt}$ to be output from the distributed power source 7 to the transmission and distribution system 1 with respect to the f change rate measured in the transmission and distribution system 1, and sets a relational expression between the f change rate and the active power $P_{DER\_dfdt}$ to be output from the distributed power source 7. The relational expression between the f change rate set here and the active power $P_{DER\_dfdt}$ to be output from the distributed power source 7 is a parameter (hereinafter referred to as a "f-change-rate control parameter") of f-change-rate control performed by the distributed-power-source control apparatus 6. Details of the f-change-rate control will be described later.

Figure 3:
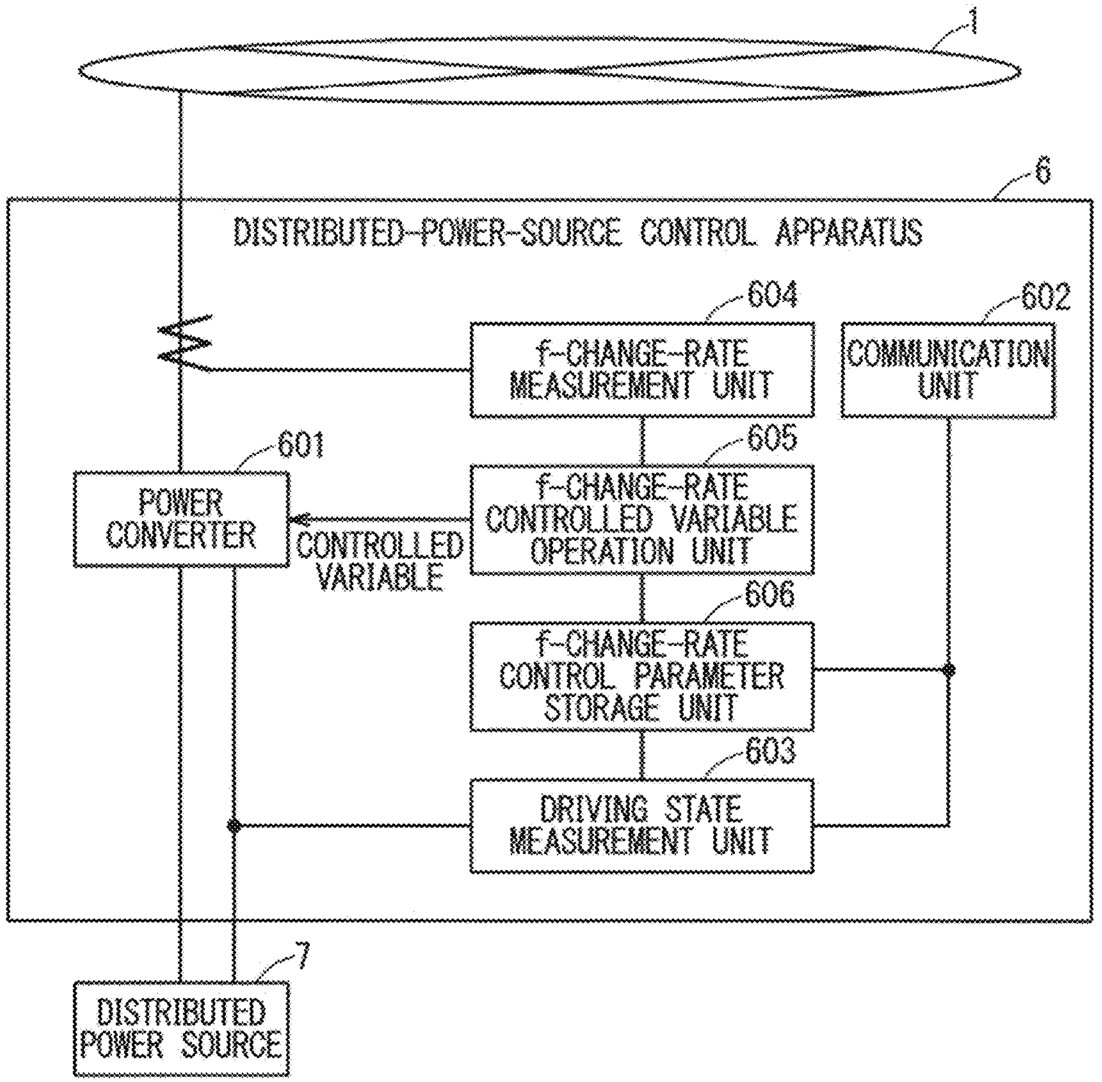
FIG. 3 is a view illustrating a configuration of a distributed-power-source control apparatus of the first embodiment.

FIG. 3 is a block diagram illustrating an example of the distributed-power-source control apparatus 6 of the first embodiment. The distributed-power-source control apparatus 6 includes a power converter 601, a communication unit 602, a driving state measurement unit 603, an f-change-rate measurement unit 604, an f-change-rate controlled variable operation unit 605, and an f-change-rate control parameter storage unit 606.

The power converter 601 is a device that performs power control for interchanging power between the distributed power source 7 and the transmission and distribution system 1. A converter that converts DC power from a DC power source such as a PV or a storage battery into AC power, a back-to-back (BTB) converter for grid-connecting a variable speed wind power generator, a cycloconverter included in a duplex feeding induction generator, or the like corresponds to the power converter 601.

The communication unit 602 communicates with the central operation unit 5 through the communication network. The communication unit 602 receives the f-change-rate control parameter from the central operation unit 5. In addition, the communication unit 602 transmits the driving states of the distributed power source 7 and the power converter 601 measured by the driving state measurement unit 603 described later to the central operation unit 5.

The driving state measurement unit 603 measures the driving states of the distributed power source 7 and the power converter 601. At this point, for example, the driving state includes the facility capacity or the current output. In addition, when the distributed power source 7 has the storage capacity, the charged electric power is included in the driving state of the distributed power source 7.

The f-change-rate measurement unit 604 calculates a change rate of a local frequency, namely, the f change rate from the measurement values of the voltage and the current at an own terminal that is an installation point of the distributed-power-source control apparatus 6.

Based on the f change rate measured by the f-change-rate measurement unit 604 and the f-change-rate control parameter stored in the f-change-rate control parameter storage unit 606, the f-change-rate controlled variable operation unit 605 calculates the active power $P_{DER\_dfdt}$ to be output from the distributed power source 7, and transmits the calculated active power $P_{DER\_dfdt}$ to the power converter 601 as the f-change-rate controlled variable.

The f-change-rate control parameter storage unit 606 stores the f-change-rate control parameter received by the communication unit 602 from the central operation unit 5.

A-2. Operation

Figure 4:
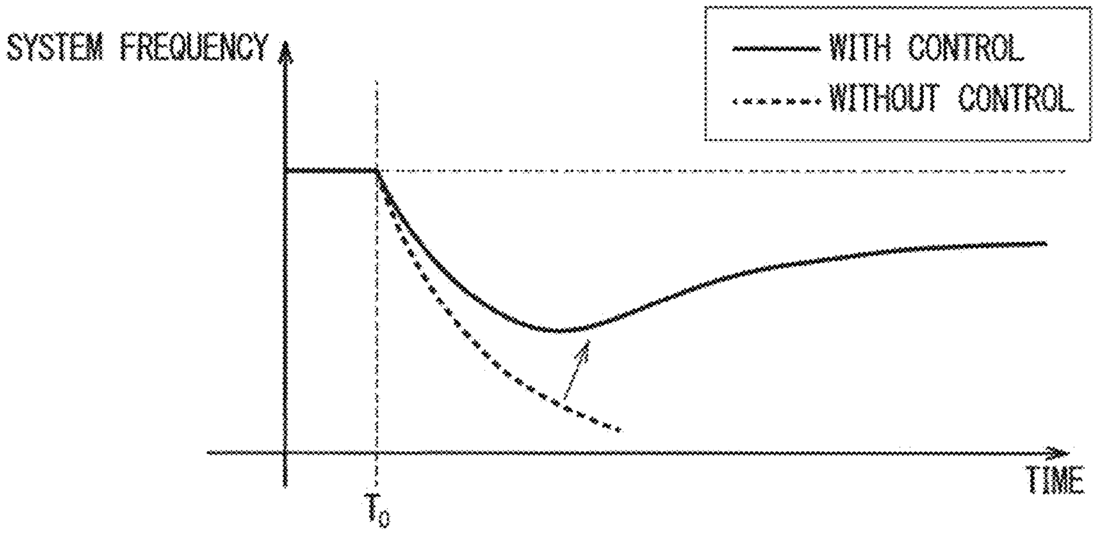
FIG. 4 is a view illustrating a change in a system frequency during generation of a system disturbance.

FIG. 4 illustrates an example of a time change in the system frequency when the system disturbance is generated in the transmission and distribution system 1. In FIG. 4, a broken line represents the case without control by the distributed-power-source control apparatus 6, and a solid line represents the case with control by the distributed-power-source control apparatus 6.

Figure 5:
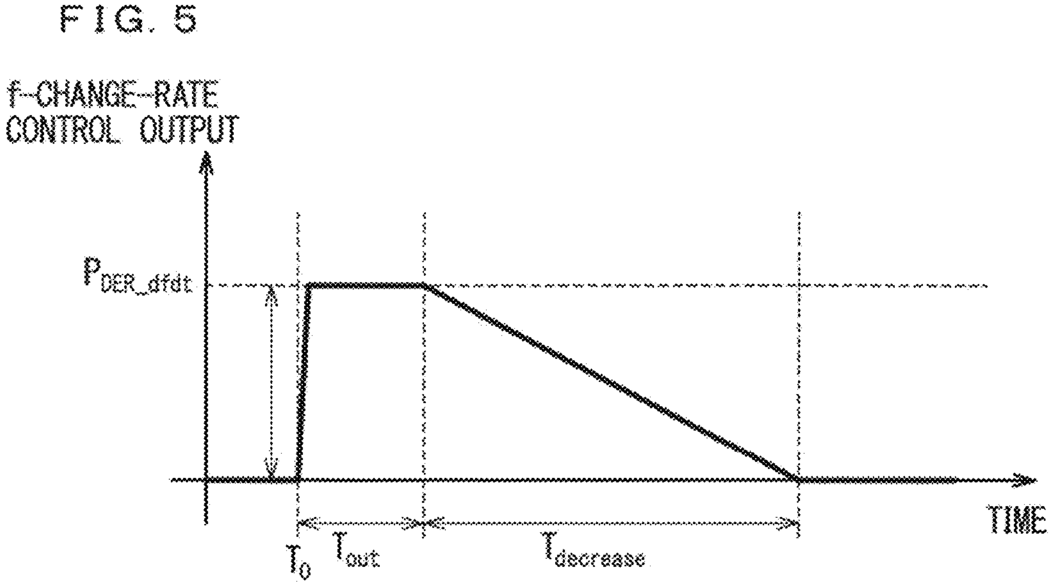
FIG. 5 is a view illustrating an output example of frequency change rate control performed by the distributed-power-source control apparatus of the first embodiment during the generation of the system disturbance.

FIG. 5 illustrates an example of the time change of the active power output in the distributed power source 7 by the f-change-rate control performed by the distributed-power-source control apparatus 6 when the system disturbance is generated in the transmission and distribution system 1. Horizontal axes in FIGS. 4 and 5 represent time. A vertical axis in FIG. 4 represents the system frequency, and a vertical axis in FIG. 5 represents the active power output.

In the examples of FIGS. 4 and 5, it is assumed that a part of the large-scale generator 2 drops off at time $T_0$. The distributed-power-source control apparatus 6 measures a steep frequency change when the disturbance is generated, and steeply increases the active power output to $P_{DER\_dfdt}$. In addition, the distributed-power-source control apparatus 6 continuously outputs the active power output with the $P_{DER\_dfdt}$ only for a certain time $T_{out}$, and then decreases the active power output for a certain time $T_{decrease}$. The active power output $P_{DER\_dfdt}$, the output duration time $T_{out}$, and the output decrease time $T_{decrease}$ are parameters (hereinafter referred to as a "f-change-rate control parameter") of the f-change-rate control. The appropriate active power output can be performed according to magnitude of the system disturbance by changing the active power output $P_{DER\_dfdt}$ according to the f change rate. The relationship between the active power output $P_{DER\_dfdt}$ and the f change rate will be described later in detail.

Generally, the distributed-power-source control in which a deviation (Δf) of the frequency from the reference value is fed back is stable but detection of the disturbance is slow, and the distributed-power-source control in which the f change rate is fed back has characteristics that the disturbance can be detected at a high speed but the control tends to be unstable. In the distributed-power-source control system 4 of the present embodiment, as illustrated in FIGS. 4 and 5, the distributed-power-source control apparatus 6 performs the distributed-power-source control so as to output the active power of the constant value $P_{DER\_dfdt}$ according to the f change rate, whereby the disturbance can be detected at a high speed and stable control can be performed, which contributes to improvement of frequency stability.

Figure 6:
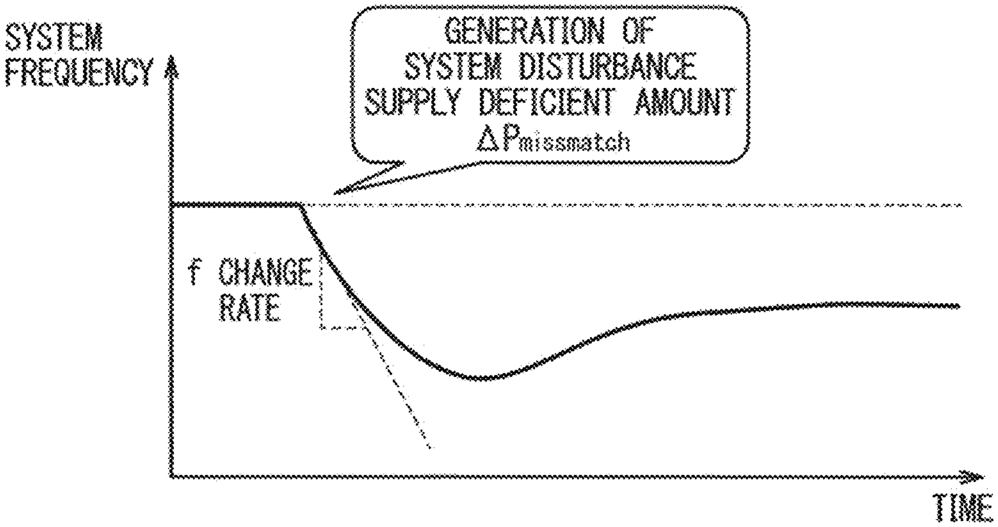
FIG. 6 is a view illustrating a relationship between a deficient amount $\Delta P_{missmatch}$ of supply force during the generation of the system disturbance and a frequency change rate in simulation performed by the central operation unit of the first embodiment.

FIG. 6 is a schematic diagram illustrating an example of the system response during the generation of the system disturbance simulated by the response operation unit 55 of the central operation unit 5. In FIG. 6, the horizontal axis represents time, and the vertical axis represents a system frequency. The example in FIG. 6 illustrates a state in which the system frequency rapidly decreases due to a part of the large-scale generator 2 drops off and the deficiency of $\Delta P_{missmatch}$ is generated in the supply power. The storage unit 52 stores the supply deficient amount $\Delta P_{missmatch}$ and the f change rate calculated for the supply deficient amount $\Delta P_{missmatch}$ from the simulation result. At this point, the f change rate is a change in the system frequency generated during a certain time. The "certain time" that defines the f change rate is arbitrary, and for example, is 100 ms. The response operation unit 55 performs the simulation as illustrated in FIG. 6 for a plurality of assumed cases of the system disturbance. Then, the storage unit 52 stores the supply deficient amount $\Delta P_{missmatch}$ in the system disturbance of each case and the f change rate calculated therefor.

Figure 7:
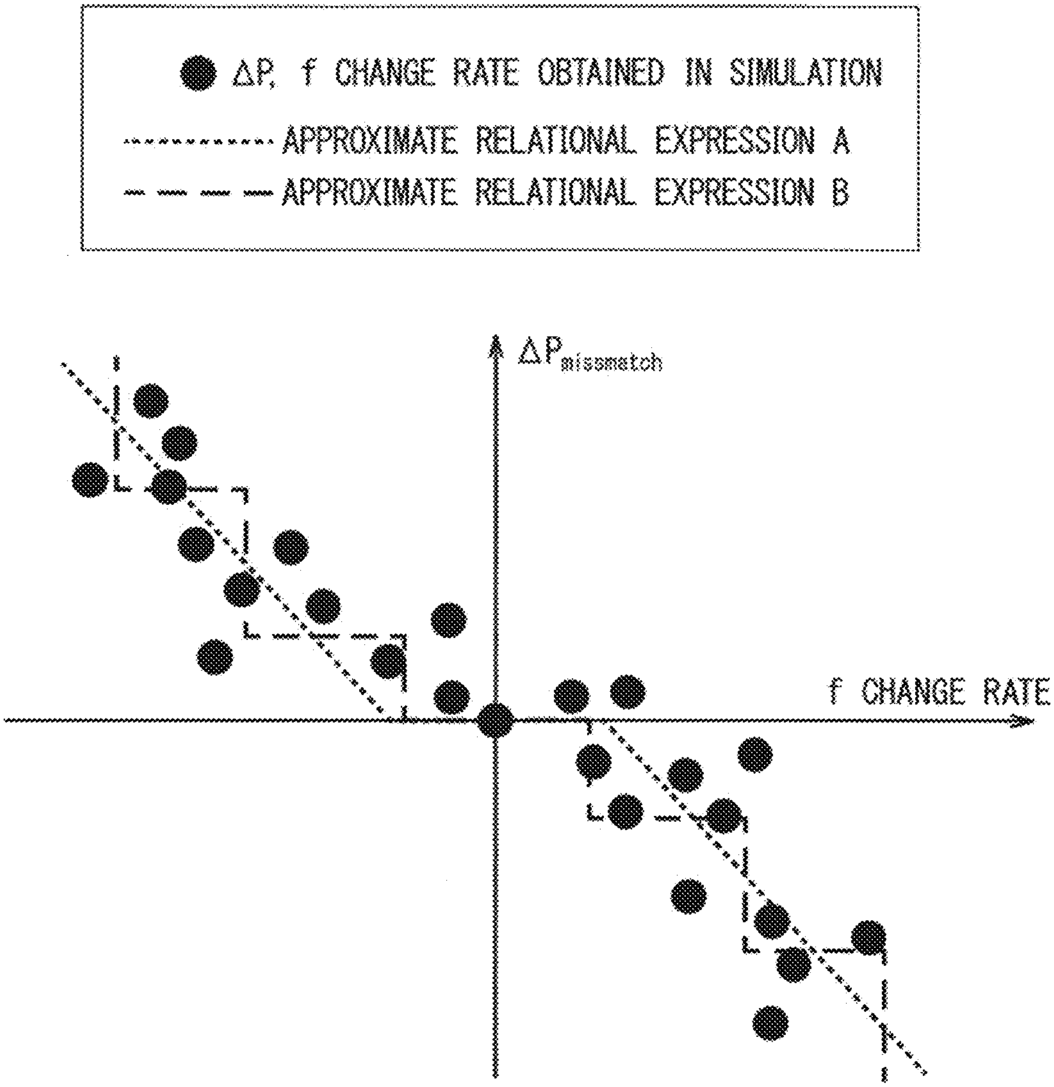
FIG. 7 is a view illustrating an example of a relationship between the deficient amount $\Delta P_{missmatch}$ of the supply force during the generation of the system disturbance and the frequency change rate, and an approximation thereof.

FIG. 7 illustrates a relationship between the supply deficient amount $\Delta P_{missmatch}$ and the f change rate in the plurality of cases of the system disturbance stored in the storage unit 52. The relationship between the supply deficient amount $\Delta P_{missmatch}$ and the f change rate changes complicatedly according to the driving state of the large-scale generator 2, the voltage and power flow state of the transmission and distribution system 1, the scale or generation position of the system disturbance, or the like, and thus a simple proportional relationship is not established. However, there is a tendency that the f change rate is negative, namely, the system frequency decreases when the $\Delta P_{missmatch}$ is positive, namely, the supply power is deficient, and the f change rate is positive, namely, the system frequency increases when the $\Delta P_{missmatch}$ is negative, namely, the supply power is excessive.

The f-change-rate control parameter operation unit 56 approximates the relationship between the supply deficient amount $\Delta P_{missmatch}$ and the f change rate from a relationship diagram of the supply deficient amount $\Delta P_{missmatch}$ and the f change rate in FIG. 7, and expresses the relationship as an approximate relational expression. The approximate relational expression may be in any form as long as it can be calculated by a computer. For example, the approximate relational expression may be an approximate relational expression A having a dead zone and a linear characteristic as represented by a dotted line in FIG. 7. The approximate relational expression may be an approximate relational expression B expressed by a step function as represented by a broken line in FIG. 7. In addition, the approximate relational expression may be a relational expression expressed by a polynomial. A method for preparing the approximate relational expression is arbitrary, but for example, a technique such as a least squares method may be used.

Figure 8:
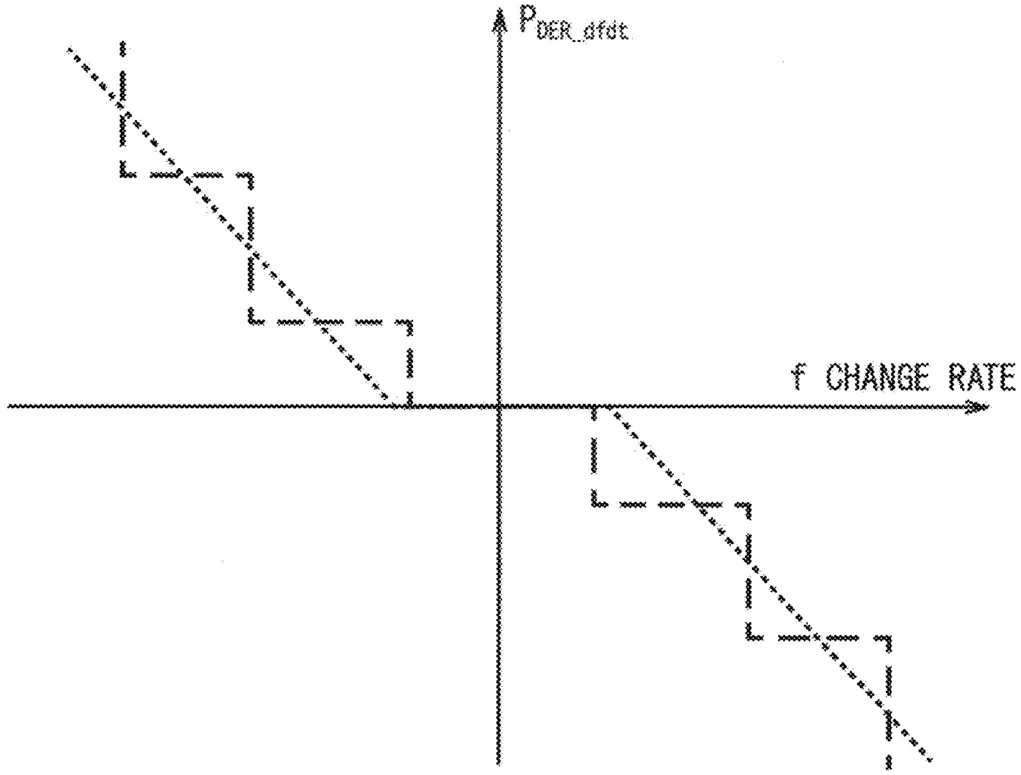
FIG. 8 is a view illustrating a relationship between an active power output value and the frequency change rate of the distributed-power-source control apparatus of the first embodiment.

FIG. 8 illustrates an example of the f-change-rate control parameter. The f-change-rate control parameter is a correspondence relation between the active power $P_{DER\_dfdt}$ to be output from the distributed power source 7 to the transmission and distribution system 1 and the f change rate. In FIG. 8, the horizontal axis represents the change rate, and the vertical axis represents the active power $P_{DER\_dfdt}$ to be output from the distributed power source 7 to the transmission and distribution system 1. The active power $P_{DER\_dfdt}$ to be output from the distributed power source 7 to the transmission and distribution system 1 is defined as a function of the f change rate. The correspondence relation between the active power $P_{DER\_dfdt}$ to be output from the distributed power source 7 to the transmission and distribution system 1 and the f change rate is desirably similar to the relationship between the supply deficient amount $\Delta P_{missmatch}$ and the f change rate.

The f-change-rate control parameter operation unit 56 determines the f-change-rate control parameter for each distributed-power-source control apparatus 6 based on the supply deficient amount $\Delta P_{missmatch}$ and the approximate relational expression of the f change rate. In the f-change-rate control parameter, the active power $P_{DER\_dfdt}$ to be output from the distributed power source 7 to the transmission and distribution system 1 is determined, for example, by the following method. The first is a method in which the supply deficient amount $\Delta P_{missmatch}$ is equally distributed by all the distributed-power-source control apparatuses 6. The second is a method for distributing the supply deficient amount $\Delta P_{missmatch}$ according to a rated capacity ratio of the distributed-power-source control apparatus 6. The third is a method for distributing the supply deficient amount $\Delta P_{missmatch}$ according to a ratio of a free capacity of the active power output of the distributed-power-source control apparatus 6.

That is, assuming that the f change rate is dfdt, the relational expression between the supply deficient amount $\Delta P_{missmatch}$ and the f change rate is $\Delta P_{missmatch}$ (dfdt), the parameter of the f-change-rate control of the distributed-power-source control apparatus 6-*i* is $P_{DER\_dfdt(i)}$ (dfdt), the total number of the distributed-power-source control apparatuses 6 is N, the rated capacity of the distributed-power-source control apparatus 6-*i* is $S_{rate(i)}$, and the active power output free capacity of the distributed-power-source control apparatus 6-*i* is $P_{reserve(i)}$, the active power $P_{DER\_dfdt}$ to be output from the distributed power source 7 to the transmission and distribution system 1 in the f-change-rate control parameter may be defined by any one of the following equations (1), (2), (3).

[Mathematical Formula 1]

$$P_{DER\_dfdt(i)}(dfdt) = \frac{\Delta P_{missmatch}(dfdt)}{N} \tag{1}$$

$$P_{DER\_dfdt(i)}(dfdt) = \frac{\Delta P_{missmatch}(dfdt) \times S_{rate(i)}}{\sum_{i=1,N} S_{rate(i)}} \tag{2}$$

$$P_{DER\_dfdt(i)}(dfdt) = \frac{\Delta P_{missmatch}(dfdt) \times P_{reserve(i)}}{\sum_{i=1,N} P_{reserve(i)}} \tag{3}$$

The central operation unit 5 determines the f-change-rate control parameter as described above, and transmits the f-change-rate control parameter from the communication unit 51 to each distributed-power-source control apparatus 6. Although the output duration time $T_{out}$ and the output decrease time $T_{decrease}$ are also included in the f-change-rate control parameter, these two parameters may not be changed according to the magnitude of the system disturbance. That is, the output duration time $T_{out}$ and the output decrease time $T_{decrease}$ may be constant values regardless of the f change rate detected by the distributed-power-source control apparatus 6. For example, it is considered that the distributed-power-source control apparatus 6 may supply the active power from the distributed power source 7 to the transmission and distribution system 1 until the large-scale generator 2 sufficiently increases the output by governor free driving based on a frequency control characteristic after the generation of the system disturbance, and both the output duration time $T_{out}$ and the output decrease time $T_{decrease}$ may be about several tens of seconds.

In the distributed-power-source control apparatus 6, the communication unit 602 receives the f-change-rate control parameter from the central operation unit 5 and stores the f-change-rate control parameter in the f-change-rate control parameter storage unit 606. When the disturbance is generated in the transmission and distribution system 1, the distributed-power-source control apparatus 6 detects the disturbance from the f change rate measured by the f-change-rate measurement unit 604. Then, as the f-change-rate controlled variable $P_{DER\_dfdt}$, the f-change-rate controlled variable operation unit 605 calculates the active power $P_{DER\_dfdt}$ to be output from the distributed power source 7 corresponding to the f change rate measured by the f-change-rate measurement unit 604 in the f-change-rate control parameter stored in the f-change-rate control parameter storage unit 606. The power converter 601 sets the active power output from the distributed power source 7 to the transmission and distribution system 1 to the f-change-rate controlled variable $P_{DER\_dfdt}$ only for the output duration time $T_{out}$, and then decreases the active power output to zero for the output decrease time $T_{decrease}$.

Figure 9:
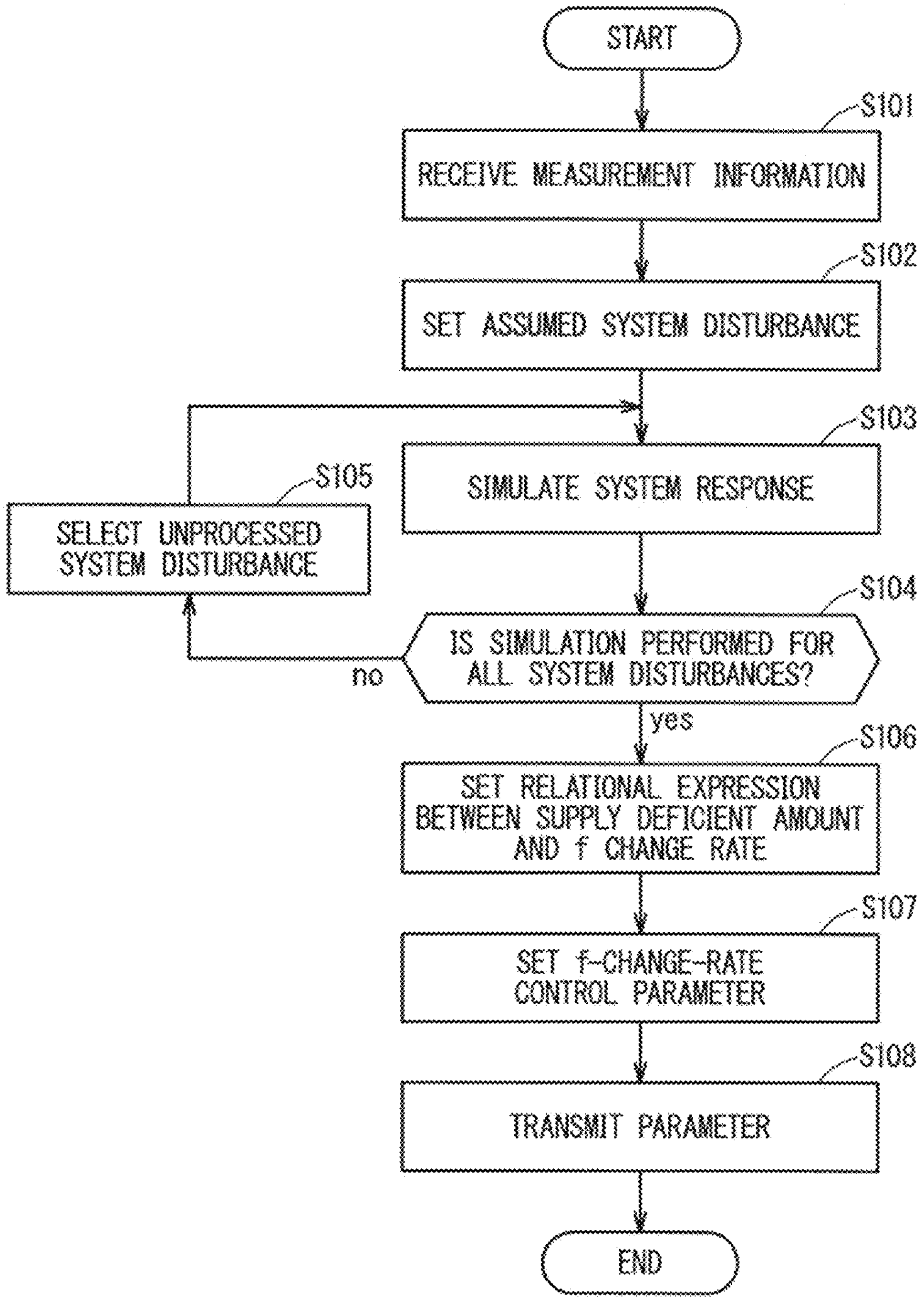
FIG. 9 is a flowchart illustrating processing of determining a parameter of the frequency change rate control by the central operation unit of the first embodiment.

FIG. 9 is a flowchart illustrating processing for determining the parameters of the f-change-rate control by the central operation unit 5.

First, in step S101, the communication unit 51 receives the measurement information about the transmission and distribution system 1 measured by the measurement apparatus 8 through the communication network.

Subsequently, in step S102, the disturbance setting unit 54 sets the system disturbance assumed to be generated in the transmission and distribution system 1.

Thereafter, in step S103, the response operation unit 55 simulates the response of the transmission and distribution system 1 at time of generation of the system disturbance set by the disturbance setting unit 54.

Subsequently, in step S104, the central operation unit 5 determines whether the response of the transmission and distribution system 1 is simulated for all the system disturbances. If there is an unprocessed system disturbance in step S104, the response operation unit 55 selects an unprocessed assumed disturbance in step S105, and the processing of the central operation unit 5 returns to step S103.

If the response of the transmission and distribution system 1 is simulated for all the system disturbances in step S104, the processing of the central operation unit 5 proceeds to step S106. In step S106, the f-change-rate control parameter operation unit 56 sets the relational expression between the supply deficient amount $\Delta P_{missmatch}$ generated by the system disturbance and the f change rate from the simulation result of the system disturbance.

Thereafter, in step S107, the f-change-rate control parameter operation unit 56 sets the f-change-rate control parameter based on the relational expression set in step S106. At this point, the f-change-rate control parameter includes the correspondence relation between the active power output $P_{DER\_dfdt}$ to be output from the distributed power source 7 to the transmission and distribution system 1 and the f change rate, the output duration time $T_{out}$, and the output decrease time $T_{decrease}$.

Finally, in step S108, the communication unit 51 transmits the f-change-rate control parameter to the distributed-power-source control apparatus 6 through the communication network.

An assumed accident of the power system and the f-change-rate control parameter determined by the central operation unit 5 change depending on the state of the transmission and distribution system 1 such as the driving state of the large-scale generator 2, the size of the load 3, or the voltage and power flow state. Consequently, the central operation unit 5 may repeatedly perform the processing of the flowchart in FIG. 9 at a constant cycle. A performance period of the processing is arbitrary, but may be about 30 minutes, for example, in view of the fact that a start and stop plan of the large-scale generator 2 is determined every about 30 minutes. Accordingly, the current state of the transmission and distribution system 1 can be reflected in the f-change-rate control parameter determined by the central operation unit 5.

A-3. Effect

The distributed-power-source control system 4 of the first embodiment includes the distributed-power-source control apparatus 6 that controls the output power from the distributed power source 7 to the transmission and distribution system 1, and the central operation unit 5 that sets the parameters used for the control by the distributed-power-source control apparatus 6. The central operation unit 5 includes the response operation unit 55 that simulates the response of the transmission and distribution system 1 at time of generation of the disturbance in the transmission and distribution system 1, and the f-change-rate control parameter operation unit 56 that obtains the correspondence relation between the f change rate, which is the frequency change rate in the transmission and distribution system 1, and the supply power deficient amount of the active power from the simulation result of the response operation unit 55 and calculates the correspondence relation between the f change rate in the transmission and distribution system 1 and the active power to be output from the distributed power source 7 to the transmission and distribution system 1 as the f-change-rate control parameter based on the correspondence relation between the f change rate in the transmission and distribution system 1 and the supply power deficient amount of the active power. The distributed-power-source control apparatus 6 includes the f-change-rate measurement unit 604 that measures the f change rate of the own terminal, the f-change-rate controlled variable operation unit 605 that sets the active power corresponding to the f change rate of the own terminal in the f-change-rate control parameter as the f-change-rate controlled variable, and the power converter 601 that controls the active power output from the distributed power source to the transmission and distribution system, based on the active power controlled variable determined based on the f-change-rate controlled variable. In the first embodiment, the active power controlled variable is the f-change-rate controlled variable. With the above configuration, the distributed-power-source control apparatus 6 can detect the disturbance at a high speed based on the f change rate and stably control the active power of the distributed power source 7. Consequently, according to the distributed-power-source control system 4, the frequency stability of the transmission and distribution system 1 can be improved and suppress the large-scale power failure without using a high-speed communication network.

B. Second Embodiment

B-1. Configuration

In the power system of the first embodiment in FIG. 1, a power system according to a second embodiment includes a central operation unit 5A instead of the central operation unit 5 and distributed-power-source control apparatuses 6A-1, 6A-2, 6A-3, 6A-4 instead of the distributed-power-source control apparatuses 6-1, 6-2, 6-3, 6-4. Hereinafter, the distributed-power-source control apparatuses 6A-1, 6A-2, 6A-3, 6A-4 will be referred to as a distributed-power-source control apparatus 6A when they are collectively referred without distinction.

Figure 10:
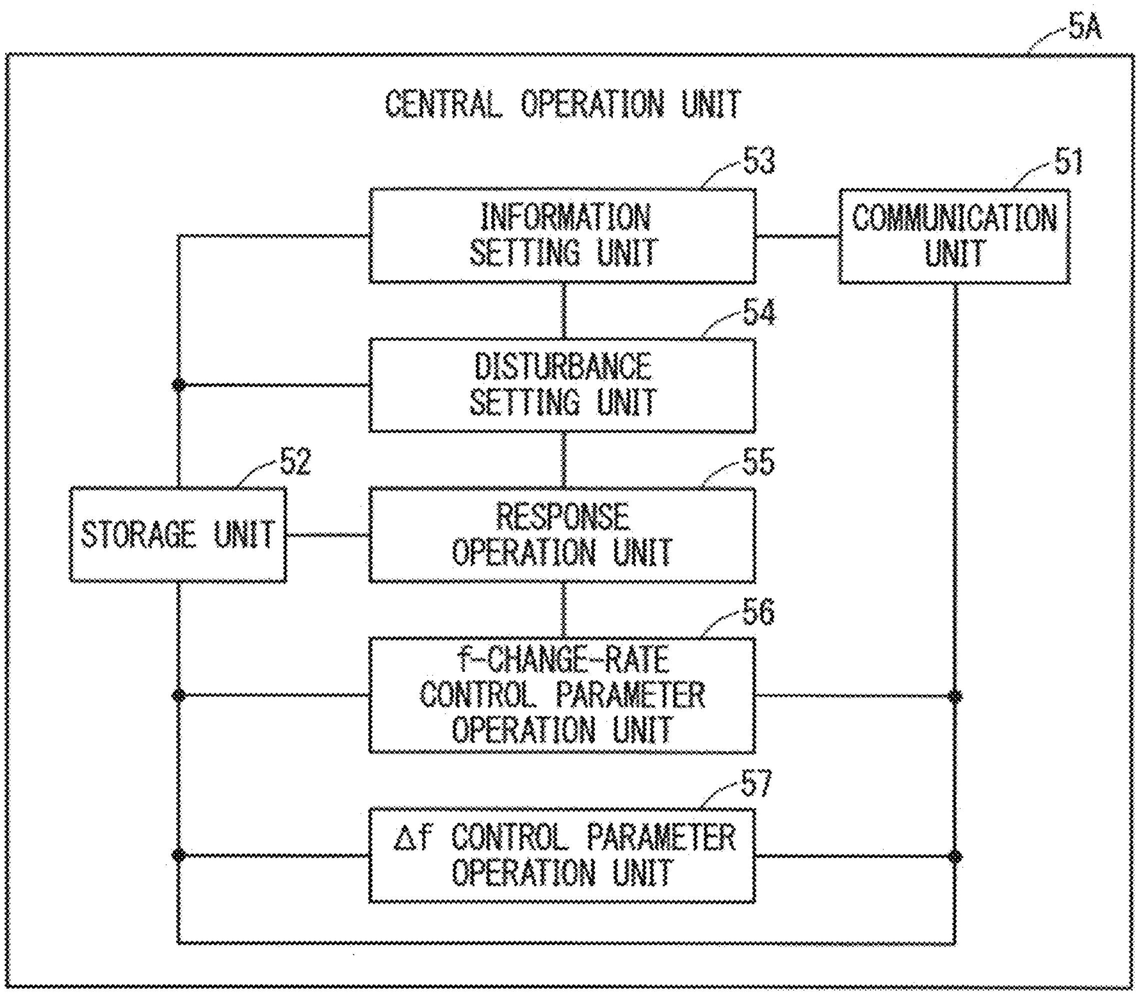
FIG. 10 is a view illustrating a configuration of a central operation unit according to a second embodiment.

FIG. 10 is a block diagram illustrating a configuration of the central operation unit 5A in the second embodiment. The central operation unit 5A includes a Δf control parameter operation unit 57 in addition to the configuration of the central operation unit 5 of the first embodiment.

The Δf control parameter operation unit 57 sets active power $P_{DER\_\Delta f}$ to be output from the distributed power source 7 to a deviation Δf from the reference value of the system frequency for each facility from the information such as the driving state of the large-scale generator 2 and the size of the load 3 that are received by the communication unit 51 and the response of the transmission and distribution system 1 calculated by the response operation unit 55 during the generation of the system disturbance. The relationship between Δf and the active power $P_{DER\_\Delta f}$ of the distributed power source 7 is a parameter (hereinafter, referred to as a "Δ control parameter") of the Δf control performed by the distributed-power-source control apparatus 6A. Details of the Δf control will be described later.

Figure 11:
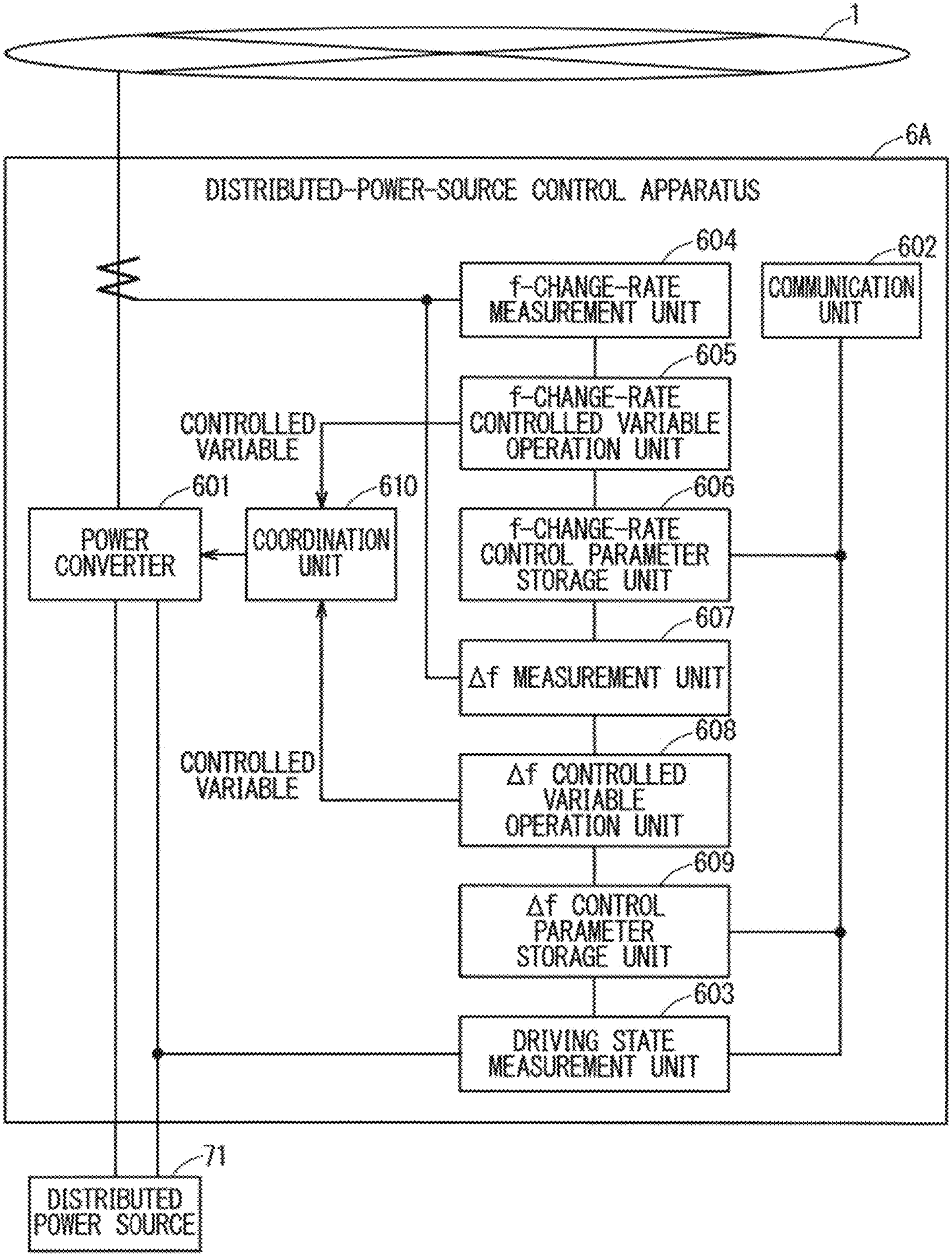
FIG. 11 is a view illustrating a configuration of a distributed-power-source control apparatus of the second embodiment.

FIG. 11 is a block diagram illustrating a configuration of the distributed-power-source control apparatus 6A of the second embodiment. The distributed-power-source control apparatus 6A includes a Δf measurement unit 607, a Δf controlled variable operation unit 608, a Δf control parameter storage unit 609, and a coordination unit 610 in addition to the configuration of the distributed-power-source control apparatus 6 of the first embodiment.

The Δf measurement unit 607 calculates the Δf based on the measurement information about the voltage and current at the point where the distributed-power-source control apparatus 6A is installed, namely, the own terminal.

The Δf controlled variable operation unit 608 sets the active power $P_{DER\_\Delta f}$ corresponding to the Δf measured by the Δf measurement unit 607 in the Δf control parameter stored in the Δf control parameter storage unit 609 as the Δf controlled variable $P_{DER\_\Delta f}$, and transmits the Δf controlled variable $P_{DER\_\Delta f}$ to the coordination unit 610.

The Δf control parameter storage unit 609 stores the Δf control parameter received from the communication unit 602.

The coordination unit 610 calculates the active power controlled variable by coordinating the f-change-rate controlled variable calculated by the f-change-rate controlled variable operation unit 605 and the f-change-rate controlled variable calculated by the Δf controlled variable operation unit 608, and transmits the active power controlled variable to the power converter 601. The power converter 601 controls the active power output of the distributed power source 7 to the active power controlled variable calculated by the coordination unit 610.

B-2. Operation

Figure 12:
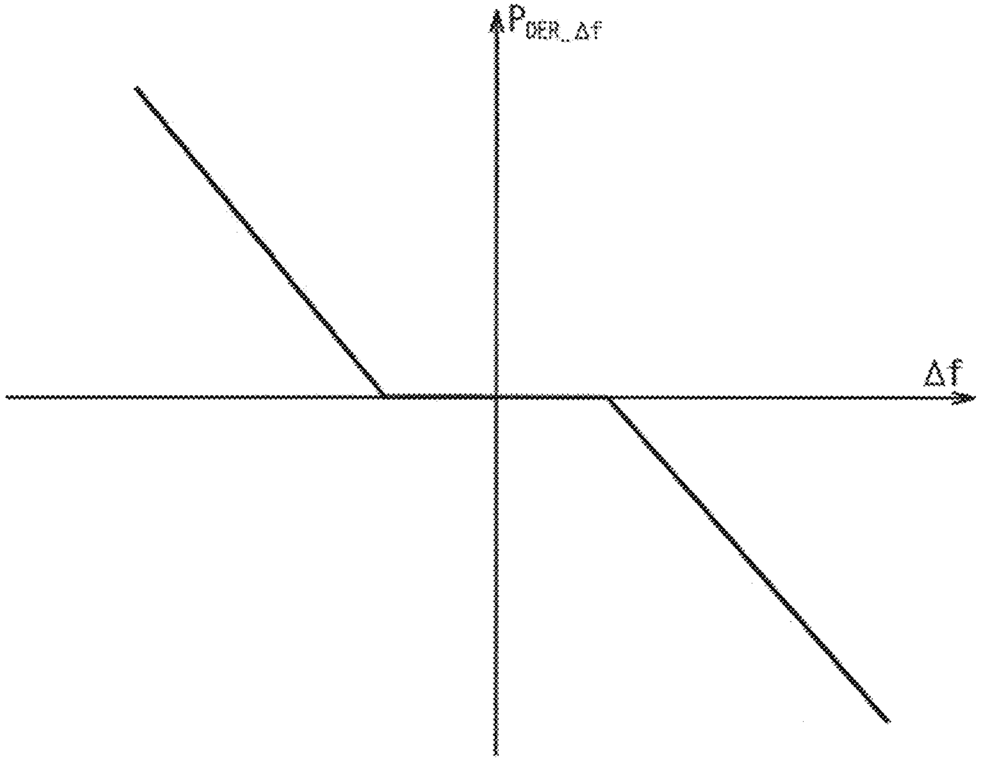
FIG. 12 is a view illustrating a relationship between an output value and a frequency deviation of the distributed-power-source control apparatus of the second embodiment.

The Δf control performed in the distributed-power-source control apparatus 6A will be described. The Δf control is to control the active power output from the distributed power source 7 according to the Δf at the own terminal of the distributed-power-source control apparatus 6A. FIG. 12 illustrates an example of the Δf control. In FIG. 12, the horizontal axis represents the Δf, and the vertical axis represents the active power output $P_{DER\_\Delta f}$. The distributed-power-source control apparatus 6A decreases the active power $P_{DER\_\Delta f}$ when the Δf is positive, namely, the supply power is excessive, and increases the active power $P_{DER\_\Delta f}$ when the Δf is negative, namely, the supply power is deficient. In order to prevent the distributed-power-source control apparatus 6A from excessively fluctuating the active power $P_{DER\_\Delta f}$ with respect to the small Δf, a dead zone for the Δf may be provided, and the $P_{DER\_\Delta f}$ may be zero in the dead zone. The change in $P_{DER\_\Delta f}$ with respect to the change in Δf may be linear. The change in $P_{DER\_\Delta f}$ with respect to the change in Δf is arbitrary. However, for example, it is desirable that the change in $P_{DER\_\Delta f}$ is determined so as not to generate over-control and under-control and not to generate hunting from a speed adjustment rate of governor free driving of the large-scale generator 2 or the frequency characteristic of the load 3.

Figure 13:
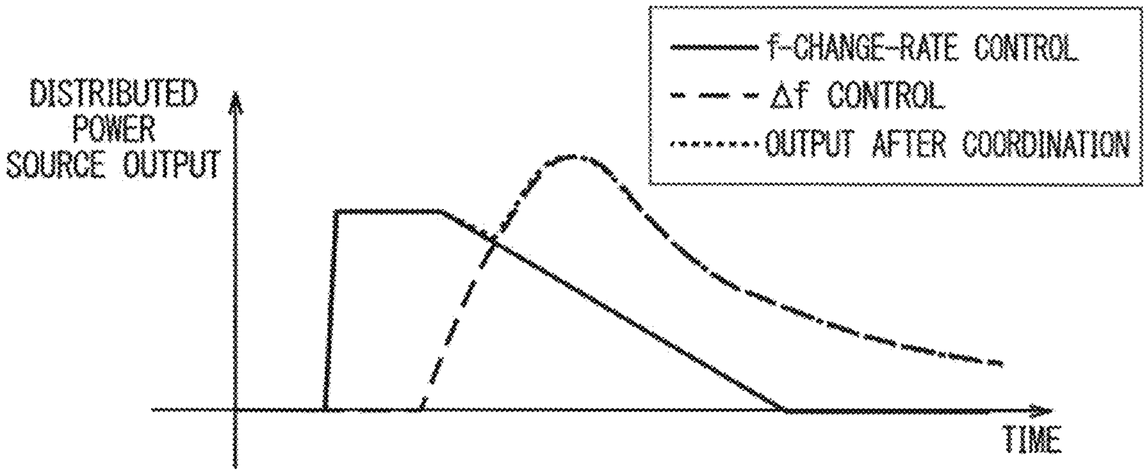
FIG. 13 is a view illustrating a coordination image of outputs of frequency change rate control and frequency deviation control by the distributed-power-source control apparatus of the second embodiment.

FIG. 13 is an image diagram illustrating the coordination of the f change rate control and the Δf that are control by the coordination unit 610 of the distributed-power-source control apparatus 6A. When the f-change-rate controlled variable $P_{DER\_dfdt}$ and the Δf controlled variable $P_{DER\_\Delta f}$ have the identical sign, the coordination unit 610 outputs either of the variables, whichever has a larger absolute value, as the active power controlled variable of the distributed power source 7. When the f-change-rate controlled variable $P_{DER\_dfdt}$ and the Δf controlled variable $P_{DER\_\Delta f}$ have different signs, the coordination unit 610 outputs a sum of the f-change-rate controlled variable $P_{DER\_dfdt}$ and the Δf controlled variable $P_{DER\_\Delta f}$ as the active power controlled variable of the distributed power source 7. Alternatively, regardless of the signs of the f-change-rate controlled variable $P_{DER\_dfdt}$ and the Δf controlled variable $P_{DER\_\Delta f}$, the coordination unit 610 may output the sum of the f-change-rate controlled variable $P_{DER\_dfdt}$ and the Δf controlled variable $P_{DER\_\Delta f}$ as the active power controlled variable of the distributed power source 7.

Generally, the distributed power source control that feeds back the Δf has a characteristic that the detection of the disturbance is stable but slow. At this point, in the f-change-rate control in FIG. 4, because the f-change-rate controlled variable is determined by the preliminary operation as described in the first embodiment, it is conceivable that the f-change-rate controlled variable is excessive or deficient due to a measurement error, generation of an unexpected disturbance, a difference in response between the simulation model and the actual system, or the like. For this reason, in the second embodiment, when the f-change-rate control and the Δf control are combined, high-speed control can be performed by the f-change-rate control, and a controlled variable can be corrected by the Δf control. As a result, the increase in the f change rate can be prevented, the Δf can be appropriately controlled, and this contributes to the improvement of the frequency stability.

Figure 14:
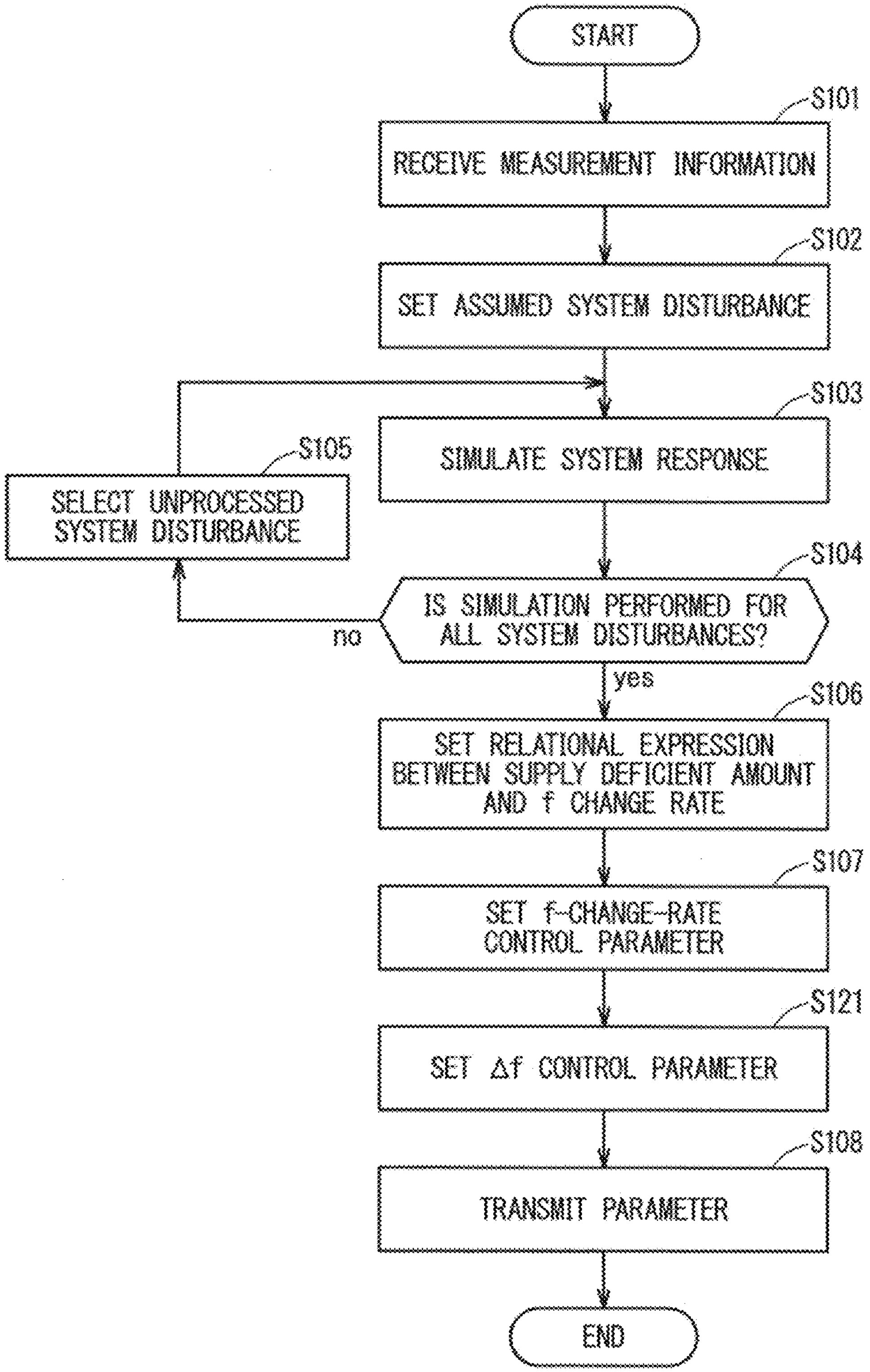
FIG. 14 is a flowchart illustrating processing for determining parameters of the frequency change rate control and the frequency deviation control by the central operation unit of the second embodiment.

FIG. 14 is a flowchart illustrating processing for determining parameters of the f-change-rate control and the Δf control by the central operation unit 5A. The flowchart of FIG. 14 is obtained by adding step S121 between step S107 and step S108 in the flowchart of FIG. 9 illustrating the processing for determining the parameter of the f-change-rate control by the central operation unit 5 of the first embodiment. In step S107, the f-change-rate control parameter operation unit 56 sets the parameters for the f-change-rate control. Thereafter, in step S121, the Δf control parameter operation unit 57 sets the parameter for the Δf control. Subsequently, in step S108, the communication unit 51 transmits the parameters of the f-change-rate control and the Δf control to the distributed-power-source control apparatus 6A through the communication network.

B-3. Effect

In the distributed-power-source control system 4 of the second embodiment, the central operation unit 5A includes the Δf control parameter operation unit 57 that calculates, as a Δf control parameter, the correspondence relation between the Δf that is the deviation of the frequency in the transmission and distribution system 1 from the reference frequency and the active power to be output from the distributed power source 7 to the transmission and distribution system 1. The distributed-power-source control apparatus 6A includes a Δf controlled variable operation unit 608 that calculates the supply deficient amount of the active power corresponding to the f change rate of the own terminal as the Δf controlled variable in the f-change-rate control parameter. The active power controlled variable is determined based on the f-change-rate controlled variable and the Δf controlled variable. With the above configuration, the distributed-power-source control apparatus 6A can correct the controlled variable by the Δf control while performing the distributed-power-source control at high speed by the f-change-rate control. As a result, the frequency stability of the transmission and distribution system 1 is improved, which contributes to avoidance of the large-scale power failure.

C. Third Embodiment

C-1. Configuration

In the power system of the first embodiment in FIG. 1, a power system according to a third embodiment includes a central operation unit 5B instead of the central operation unit 5 and distributed-power-source control apparatuses 6B-1, 6B-2, 6B-3, 6B-4 instead of the distributed-power-source control apparatuses 6-1, 6-2, 6-3, 6-4. Hereinafter, the distributed-power-source control apparatuses 6B-1, 6B-2, 6B-3, 6B-4 will be referred to as a distributed-power-source control apparatus 6B when collectively referred without distinction.

Figure 15:
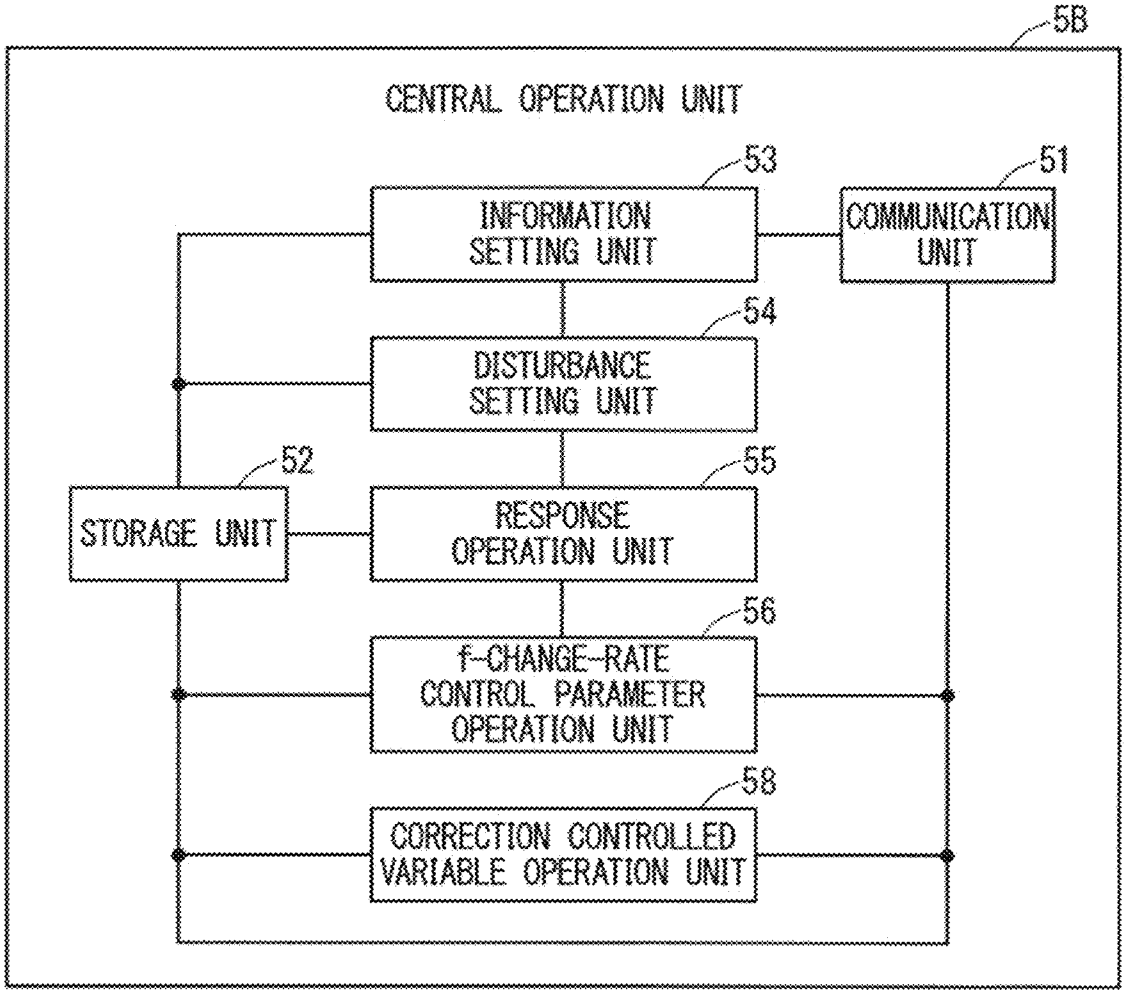
FIG. 15 is a view illustrating a configuration of a central operation unit according to a third embodiment.

FIG. 15 is a block diagram illustrating an example of a configuration of the central operation unit 5B in the third embodiment. The central operation unit 5B includes a correction controlled variable operation unit 58 in addition to the configuration of the central operation unit 5 of the first embodiment.

When the system disturbance is generated in the transmission and distribution system 1, the communication unit 51 receives the information about the system disturbance, namely, the system disturbance information from the measurement apparatus 8. The correction controlled variable operation unit 58 calculates the supply deficient amount $\Delta P_{missmatch}$ based on the system disturbance information received by the communication unit 51. Thereafter, the correction controlled variable operation unit 58 calculates the correction controlled variable $P_{DER\_COR}$ for each distributed-power-source control apparatus 6B. The correction controlled variable $P_{DER\_COR}$ calculated by the correction controlled variable operation unit 58 is output to the distributed-power-source control apparatus 6B by the communication unit 51.

The method for determining the correction controlled variable $P_{DER\_COR}$ is similar to the method for determining the parameter $P_{DER\_dfdt}$ of the f-change-rate control described in the first embodiment. That is, (1) a method for equally distributing the supply deficient amount $\Delta P_{missmatch}$ by all the distributed-power-source control apparatuses 6B, (2) a method for distributing the supply deficient amount $\Delta P_{missmatch}$ according to the rated capacity ratio of the distributed-power-source control apparatus 6B, (3) a method for distributing the supply deficient amount $\Delta P_{missmatch}$ according to the ratio of the free capacity of the active power output of the distributed-power-source control apparatus 6B, and the like are exemplified.

Figure 16:
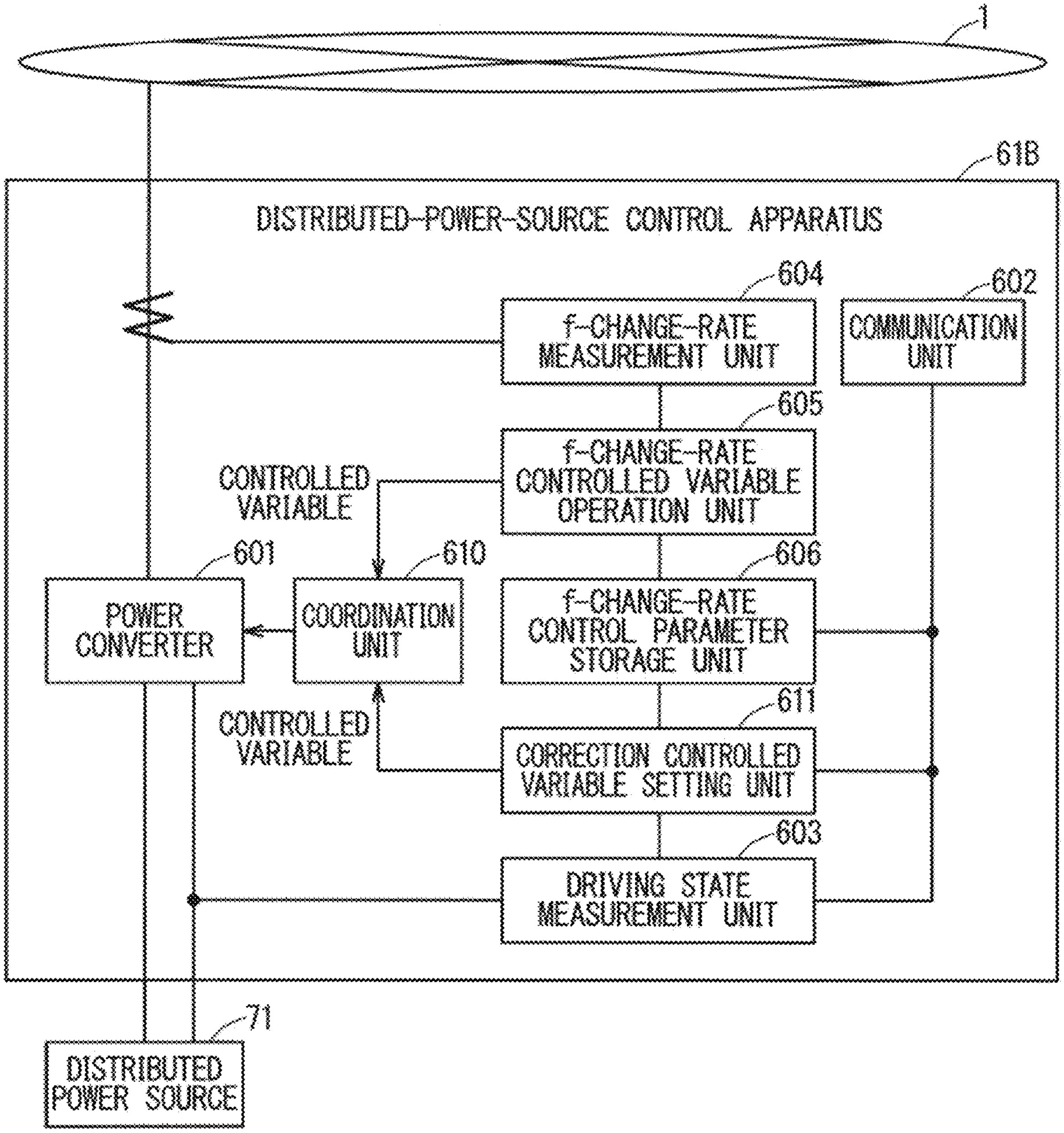
FIG. 16 is a view illustrating a configuration of a distributed-power-source control apparatus of the third embodiment.

FIG. 16 is a block diagram illustrating an example of the distributed-power-source control apparatus 6B of the third embodiment. The distributed-power-source control apparatus 6B includes the coordination unit 610 and a correction controlled variable setting unit 611 in addition to the configuration of the distributed-power-source control apparatus 6 of the first embodiment. The coordination unit 610 of the distributed-power-source control apparatus 6B is similar to the coordination unit 610 of the distributed-power-source control apparatus 6A of the second embodiment.

The correction controlled variable setting unit 611 stores the controlled variable $\Delta P_{DER\_COR}$ of the correction control received by the communication unit 602 from the central operation unit 5B, and transmits the controlled variable $\Delta P_{DER\_COR}$ of the correction control to the coordination unit 610.

The coordination unit 610 coordinates the controlled variable $\Delta P_{DER\_dfdt}$ of the f-change-rate control calculated by the f-change-rate controlled variable operation unit 605 with the controlled variable $\Delta P_{DER\_COR}$ of the correction control received from the correction controlled variable setting unit 611, calculates an active power command value that is a target value of the active power to be output by the distributed power source 7, and transmits the active power command value to the power converter 601.

The controlled variable $\Delta P_{DER\_COR}$ of the correction control continues at a constant value for the certain time and then decreases. The time during which $\Delta P_{DER\_COR}$ continues the constant value is arbitrary, but for example, it is considered that the distributed-power-source control apparatus 6B performs the output until the output of the large-scale generator 2 sufficiently rises by the governor free driving or load frequency control (LFC) of the large-scale generator 2, which is a frequency control function of the transmission and distribution system 1, and the output duration time may be about several minutes.

C-2. Operation

Figure 17:
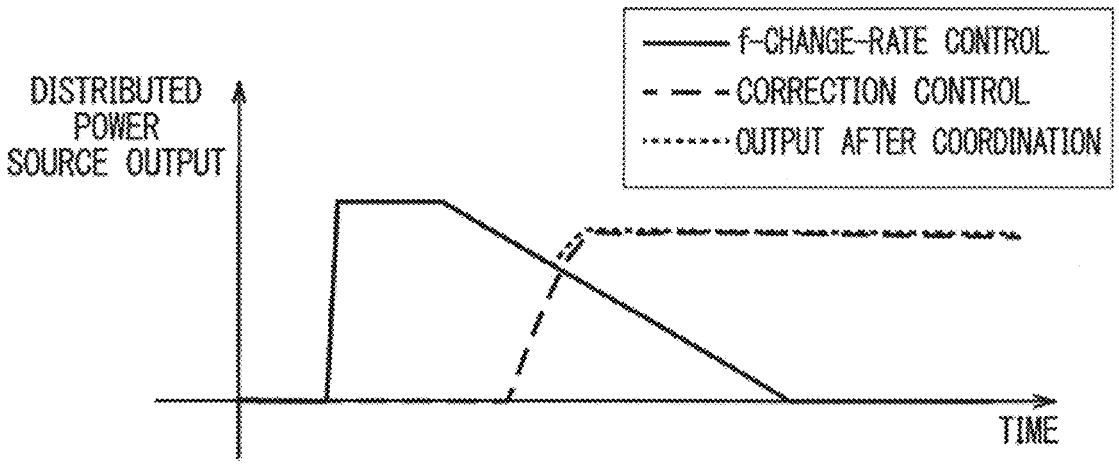
FIG. 17 is a view illustrating a coordination image of outputs of frequency change rate control and correction control by the distributed-power-source control apparatus of the third embodiment.

FIG. 17 is an image diagram illustrating the coordination of the f-change-rate control and the correction control by the coordination unit 610 of the distributed-power-source control apparatus 6B. When the controlled variable $\Delta P_{DER\_dfdt}$ of the f-change-rate control and the controlled variable $\Delta P_{DER\_COR}$ of the correction control have the identical sign, the coordination unit 610 sets either of the variables, whichever has a larger absolute value, as the active power command value to the distributed power source 7. When the controlled variable $\Delta P_{DER\_dfdt}$ of the f-change-rate control and the controlled variable $\Delta P_{DER\_COR}$ of the correction control have different signs, the coordination unit 610 sets the sum of the controlled variable $\Delta P_{DER\_dfdt}$ and the controlled variable $\Delta P_{DER\_COR}$ as the active power command value to the distributed power source 7. Alternatively, regardless of the signs of the controlled variable $\Delta P_{DER\_dfdt}$ of the f-change-rate control and the controlled variable $\Delta P_{DER\_COR}$ of the correction control, the coordination unit 610 may use the sum of the controlled variable $\Delta P_{DER\_dfdt}$ and the controlled variable $\Delta P_{DER\_COR}$ as the active power command value to the distributed power source 7 of the distributed power source 7.

The system disturbance is detected by the central operation unit 5B, the controlled variable of the distributed-power-source control apparatus 6B is determined, and the controlled variable is transmitted from the central operation unit 5B to the distributed-power-source control apparatus 6B through the communication network. In such the case, generally a very expensive and high-speed communication network is required to be used in order to perform high-speed control. In the f-change-rate control, because the f-change-rate controlled variable is determined by the preliminary operation as described in the first embodiment, it is conceivable that the f-change-rate controlled variable is excessive or deficient due to the measurement error, the generation of the unexpected disturbance, the difference in response between the simulation model and the actual system, or the like. For this reason, in the third embodiment, the combination of the f-change-rate control and the correction control that can be implemented even if a relatively slow communication network is used can perform the high-speed control by the f-change-rate control, and the correction control can correct the controlled variable. As a result, this contributes to the improvement of the frequency stability.

Figure 18:
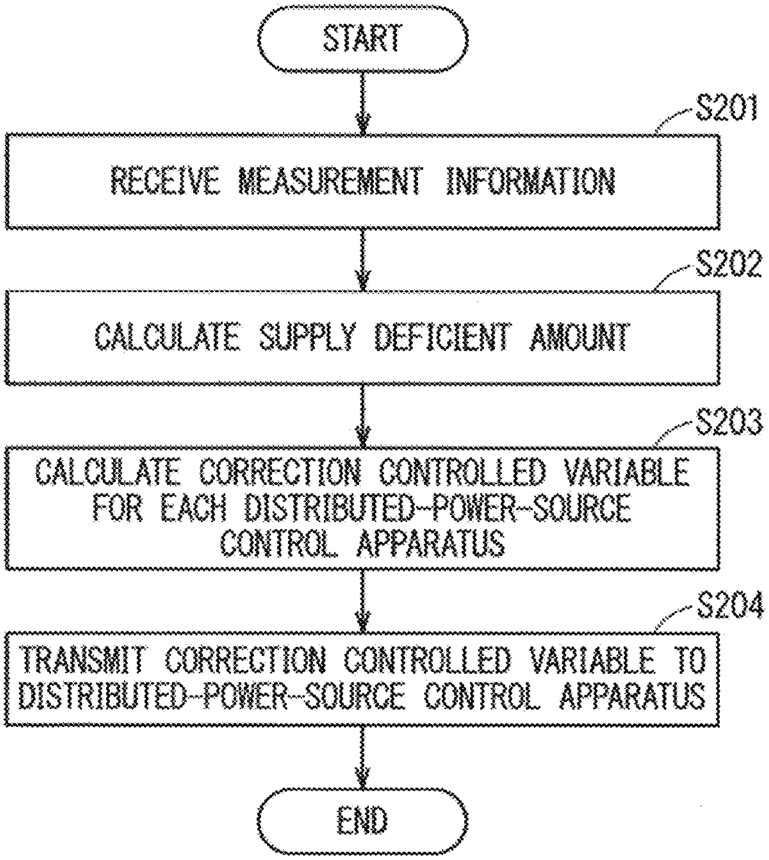
FIG. 18 is a flowchart illustrating processing for determining a parameter of correction control by the central operation unit of the third embodiment.

FIG. 18 is a flowchart illustrating processing for determining the parameter of the correction control by the central operation unit 5B.

In step S201, when the system disturbance is generated in the transmission and distribution system 1, the communication unit 51 receives the measurement information about the transmission and distribution system 1 measured by the measurement apparatus 8 through the communication network.

Subsequently, in step S202, the correction controlled variable operation unit 58 calculates the supply deficient amount $\Delta P_{missmatch}$ generated in the transmission and distribution system 1.

Thereafter, in step S203, the correction controlled variable operation unit 58 determines the correction controlled variable $P_{DER\_COR}$ for each distributed-power-source control apparatus 6B based on the supply deficient amount $\Delta P_{missmatch}$.

Finally, in step S204, the communication unit 51 transmits the correction controlled variable $P_{DER\_COR}$ to the distributed-power-source control apparatus 6B through the communication network.

C-3. Effect

In the distributed-power-source control system 4 of the third embodiment, the central operation unit 5B includes the correction controlled variable operation unit 58 that calculates, as the correction controlled variable, the supply deficient amount $\Delta P_{missmatch}$ of the active power generated in the transmission and distribution system 1 during the generation of the disturbance, and calculates the active power to be output to the transmission and distribution system 1 by the distributed power source 7 based on the supply deficient amount of the active power generated in the transmission and distribution system 1. The active power controlled variable is determined based on the f-change-rate controlled variable and the correction controlled variable. With the above configuration, in the distributed-power-source control system 4 of the third embodiment, the distributed-power-source control apparatus 6B can correct the f-change-rate controlled variable with the correction controlled variable while performing the f-change-rate control in which the f change rate is detected at a high speed at the own terminal to perform the active power control. Accordingly, the frequency stability of the transmission and distribution system 1 is improved, which contributes to avoidance of the large-scale power failure.

D. Fourth Embodiment

D-1. Configuration

The system frequency of the power system fluctuates due to collapse of the supply and demand balance of the active power. For this reason, it is common to control the system frequency by controlling the active power.

On the other hand, the load 3 of the power system has a voltage characteristic. That is, power consumption of the load 3 increases when the voltage increases, and the power consumption decreases when the voltage decreases. Using this characteristic to control the reactive power of the distributed power source 7, the voltage of the load 3 can be increased or decreased, and the power consumption of the load 3 is changed to contribute to the improvement of the frequency stability. According to this method, even when the distributed power source 7 has a low active power control capability, for example, a PV without a power storage apparatus, wind power generation, a storage battery system without charged electric power or a charge free capacity, or the like, the performance of the reactive power control can contribute to the improvement of the frequency stability.

In the power system of the first embodiment in FIG. 1, a power system according to a fourth embodiment includes a central operation unit 5C instead of the central operation unit 5 and distributed-power-source control apparatuses 6C-1, 6C-2, 6C-3, 6C-4 instead of the distributed-power-source control apparatuses 6-1, 6-2, 6-3, 6-4. Hereinafter, the distributed-power-source control apparatuses 6C-1, 6C-2, 6C-3, 6C-4 will be referred to as a distributed-power-source control apparatus 6C when collectively referred without distinction.

Figure 19:
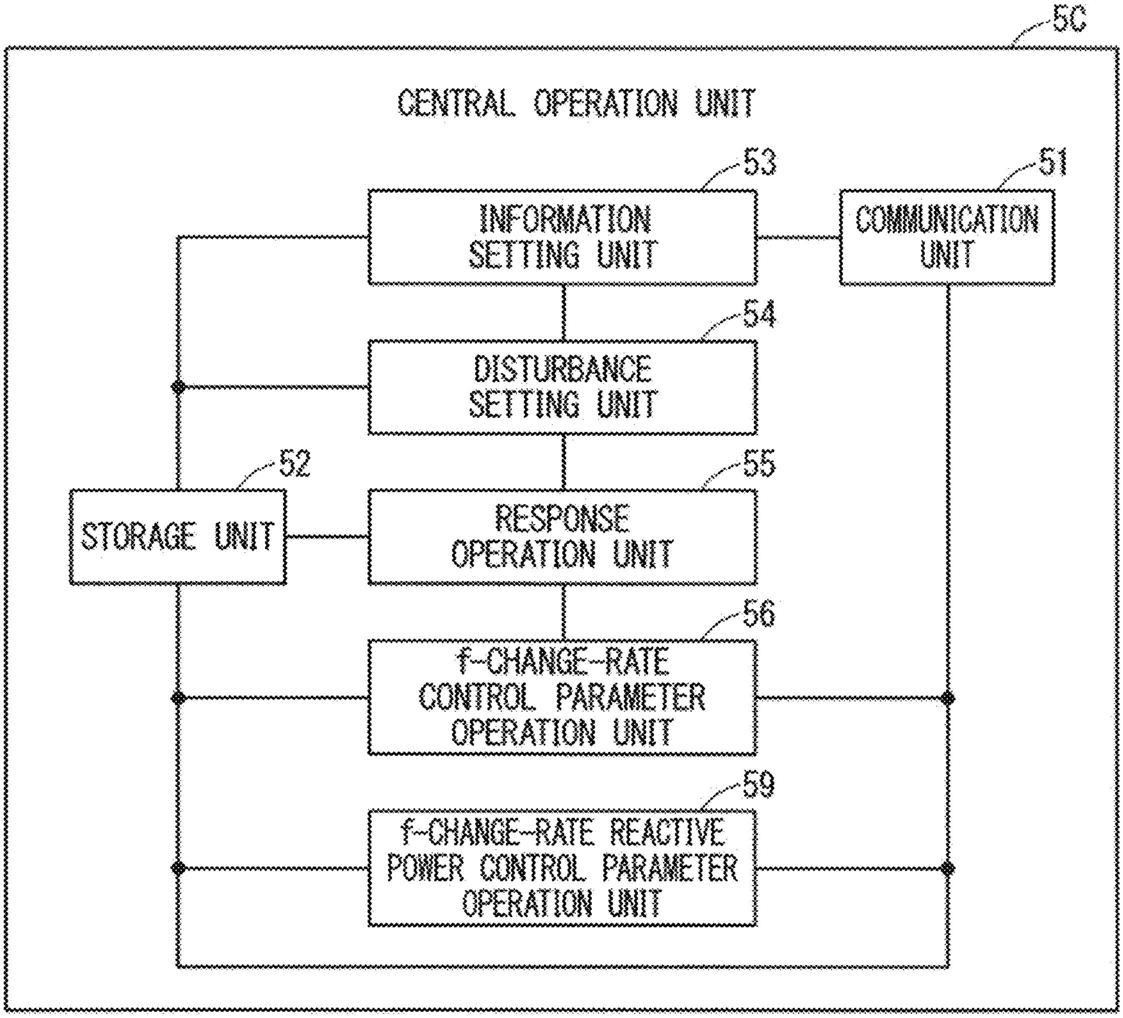
FIG. 19 is a view illustrating a configuration of a central operation unit according to a fourth embodiment.

FIG. 19 is a block diagram illustrating an example of the configuration of the central operation unit 5C in the fourth embodiment. The central operation unit 5C includes an f-change-rate reactive power control parameter operation unit 59 in addition to the configuration of the central operation unit 5 of the first embodiment.

Based on the relationship between the supply deficient amount $\Delta P_{missmatch}$ of the active power during the generation of the system disturbance and the f change rate calculated by the f-change-rate control parameter operation unit 56, the f-change-rate reactive power control parameter operation unit 59 calculates the reactive power $\Delta Q_{DER\_dfdt}$ to be output from the distributed-power-source control apparatus 6C to the transmission and distribution system 1 for each facility with respect to the f change rate measured in the transmission and distribution system 1. Then, the f-change-rate reactive power control parameter operation unit 59 sets a relational expression between the f change rate and the reactive power $\Delta Q_{DER\_dfdt}$, and uses the relational expression as the parameter of the f-change-rate reactive power control performed by the distributed-power-source control apparatus 6C. Details of the f-change-rate reactive power control will be described later.

Figure 20:
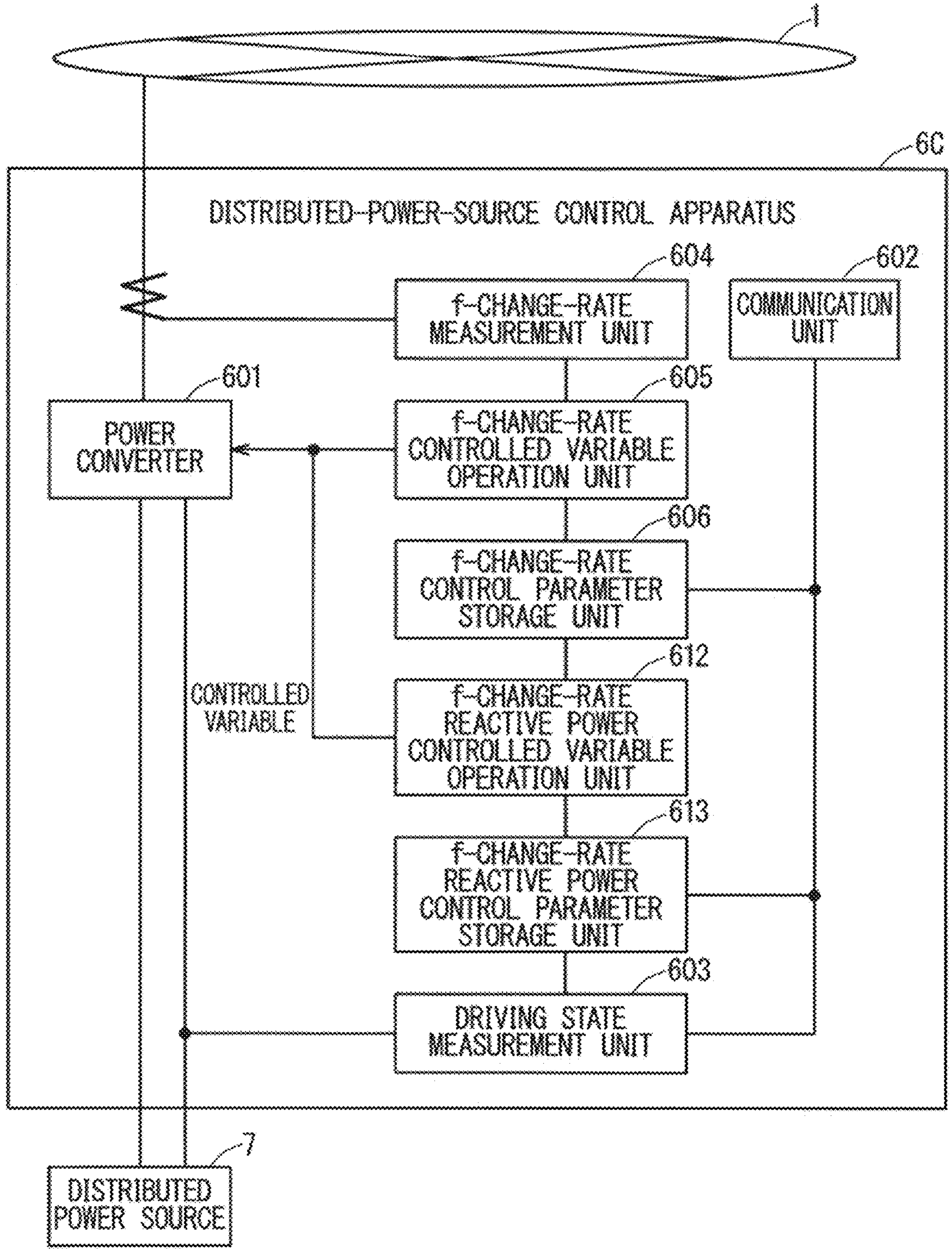
FIG. 20 is a view illustrating a configuration of a distributed-power-source control apparatus of the fourth embodiment.

FIG. 20 is a block diagram illustrating an example of the distributed-power-source control apparatus 6C in the fourth embodiment. The distributed-power-source control apparatus 6C includes an f-change-rate reactive power controlled variable operation unit 612 and an f-change-rate reactive power control parameter storage unit 613 in addition to the configuration of the distributed-power-source control apparatus 6 of the first embodiment.

Based on the f change rate measured by the f-change-rate measurement unit 604 and the f-change-rate reactive power control parameter stored in the f-change-rate reactive power control parameter storage unit 613, the f-change-rate reactive power controlled variable operation unit 612 calculates the reactive power $\Delta Q_{DER\_dfdt}$ to be output from the distributed-power-source control apparatus 6C to the transmission and distribution system 1, and transmits the value of the reactive power $\Delta Q_{DER\_dfdt}$ as the f-change-rate reactive power controlled variable to the power converter 601. The power converter 601 converts the output power of the distributed power source 71 and controls its reactive power to the f-change-rate reactive power controlled variable $\Delta Q_{DER\_dfdt}$.

The f-change-rate reactive power control parameter storage unit 613 stores the f-change-rate reactive power control parameter received by the communication unit 602 from the central operation unit 5C.

D-2. Operation

Figure 21:
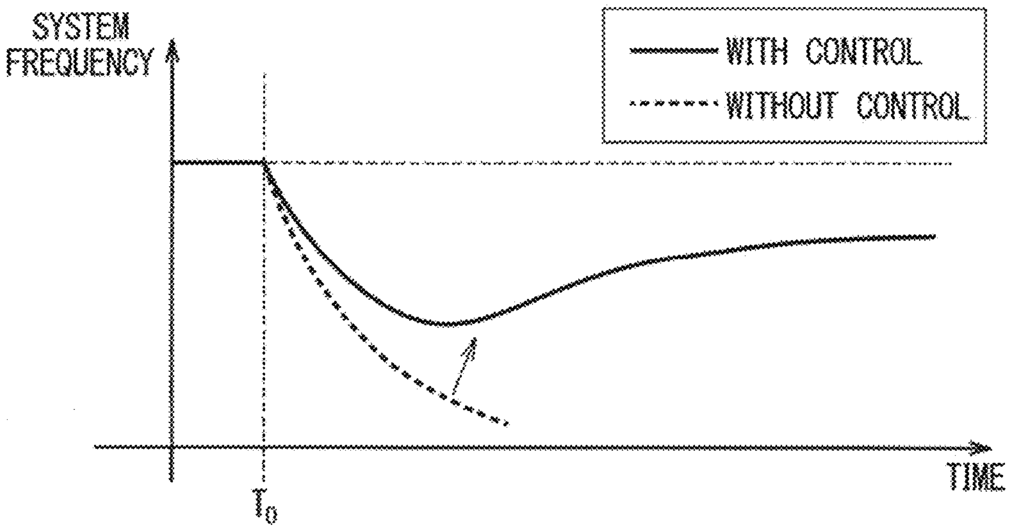
FIG. 21 is a view illustrating a change in a system frequency during the generation of the system disturbance.

FIG. 21 illustrates an example of the time change in the system frequency when the system disturbance is generated in the transmission and distribution system 1. In FIG. 21, the broken line represents the case without control by the distributed-power-source control apparatus 6, and the solid line represents the case with control by the distributed-power-source control apparatus 6.

Figure 22:
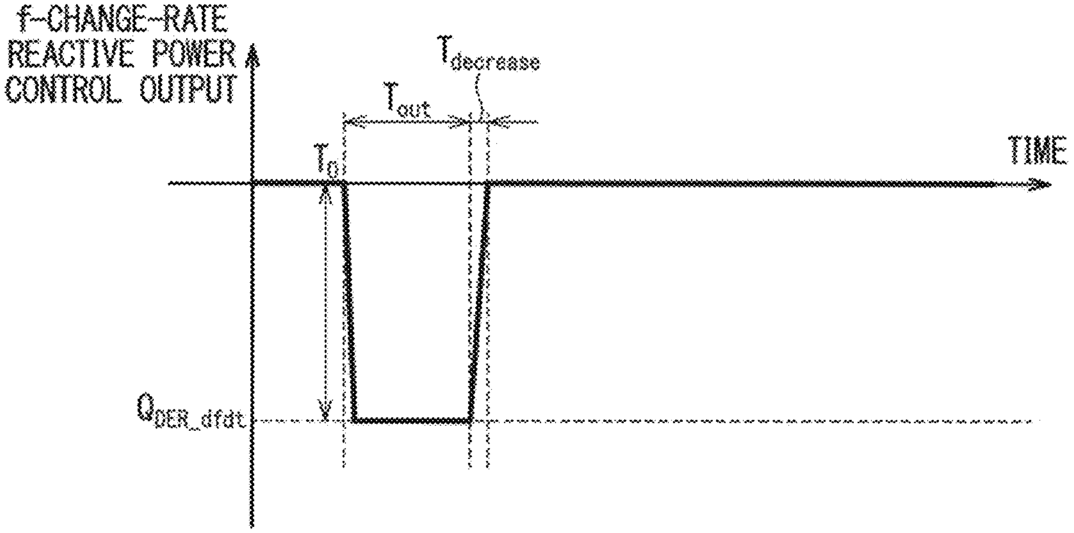
FIG. 22 is a view illustrating an output example of frequency-change-rate reactive power control performed by the distributed-power-source control apparatus of the fourth embodiment during the generation of the system disturbance.

FIG. 22 illustrates an example of the time change in the reactive power output in the distributed power source 7 by the f-change-rate reactive power control performed by the distributed-power-source control apparatus 6 during the generation of the system disturbance in the transmission and distribution system 1. The horizontal axes in FIGS. 21 and 22 represent time. The vertical axis in FIG. 21 represents the system frequency, and the vertical axis in FIG. 22 represents the reactive power output.

In the examples of FIGS. 21 and 22, it is assumed that a part of the large-scale generator 2 drops off at time $T_0$. The distributed-power-source control apparatus 6C measures a steep frequency change during the generation of the disturbance, and steeply decreases the reactive power output to $Q_{DER\_dfdt}$. In addition, the distributed-power-source control apparatus 6C continuously outputs the reactive power output at $Q_{DER\_dfdt}$ only for the certain time $T_{out}$, and then decreases the reactive power output for the certain time $T_{decrease}$. The reactive power output $Q_{DER\_dfdt}$, the output duration time $T_{out}$, and the output decrease time $T_{decrease}$ are parameters (hereinafter, referred to as a "f-change-rate reactive power control parameter") of the f-change-rate reactive power control. The appropriate reactive power output according to the magnitude of the system disturbance can be performed by changing the reactive power output $Q_{DER\_dfdt}$ according to the f change rate. Details of the relationship between the reactive effective power output $Q_{DER\_dfdt}$ and the f change rate will be described later.

Figure 23:
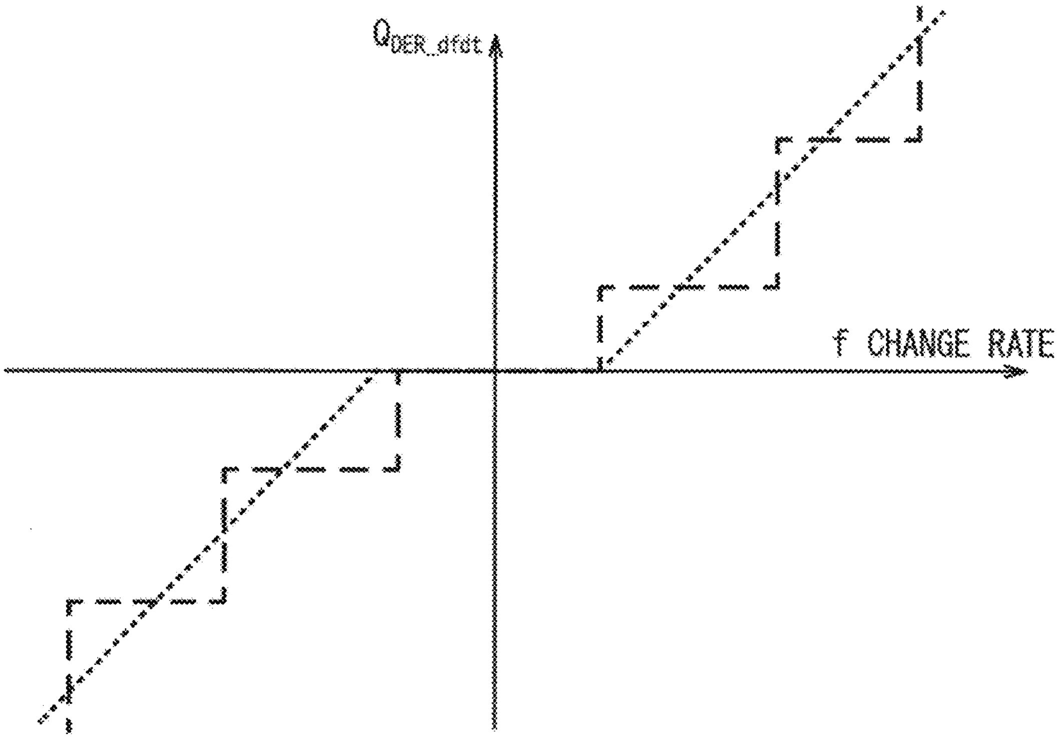
FIG. 23 is a view illustrating a relationship between a reactive power output value and a frequency change rate of the distributed-power-source control apparatus of the fourth embodiment.

FIG. 23 illustrates an example of the f-change-rate reactive power control parameter. In FIG. 23, the horizontal axis represents the f change rate, and the vertical axis represents the reactive power $Q_{DER\_dfdt}$ to be output from the distributed power source 7 to the transmission and distribution system 1. The reactive power $Q_{DER\_dfdt}$ to be output from the distributed power source 7 to the transmission and distribution system 1 is defined as a function of the f change rate. The relationship between the reactive power $Q_{DER\_dfdt}$ to be output from the distributed power source 7 to the transmission and distribution system 1 and the f change rate is desirably similar to the relationship between the supply deficient amount $\Delta P_{missmatch}$ and the f change rate. The f-change-rate reactive power control parameter operation unit 59 determines the parameter $Q_{DER\_dfdt}$ of the f-change-rate reactive power control for each distributed-power-source control apparatus 6C based on the supply deficient amount $\Delta P_{missmatch}$ and the approximate relational expression of the f change rate.

Load power change sensitivity expressing how much the active power of the load 3 changes according to the change in the reactive power of the distributed power source 7 is required to be calculated in determining the parameter $Q_{DER\_dfdt}$. The f-change-rate reactive power control parameter operation unit 59 calculates the load power change sensitivity with respect to the reactive power control using any one of the following methods.

The first is a simulation based method. That is, simulation of changing the reactive power output by a certain amount is performed for each distributed-power-source control apparatus 6C, and the change in the active power of the load 3 at that time is calculated.

The second method is a method using a voltage sensitivity matrix. The active power and the reactive power flowing into a certain node of the power grid are expressed by a node voltage and an admittance of the system, and this equation is called a power flow equation. The inverse matrix of the matrix (Jacobian matrix) produced by partially differentiating the power flow equation of each node with the magnitude and phase angle of the voltage of each node indicates the sensitivity of the voltage change of the node with respect to the change in the active power and the reactive power of the node, and is called a voltage sensitivity matrix. Using this voltage sensitivity matrix, the change in the load voltage and the change in the load active power during the change in the reactive power output can be calculated for each distributed-power-source control apparatus 6C.

After determining the active power controlled variable borne by the distributed-power-source control apparatus 6C, the f-change-rate reactive power control parameter operation unit 59 determines the parameter $Q_{DER\_dfdt}$ of the f-change-rate reactive power control based on the relationship between the reactive power output and the active power change of the load 3. Examples of a method for determining the active power controlled variable borne by the distributed-power-source control apparatus 6C include (1) a method for equally distributing the supply deficient amount $\Delta P_{missmatch}$ by all the distributed-power-source control apparatuses 6C, (2) a method for distributing the supply deficient amount $\Delta P_{missmatch}$ according to the rated capacity ratio of the distributed-power-source control apparatus 6C, and (3) a method for distributing the supply deficient amount $\Delta P_{missmatch}$ according to the ratio of the free capacity of the active power output of the distributed-power-source control apparatus 6C.

The central operation unit 5C determines the f-change-rate control parameter $P_{DER\_dfdt}$ and the f-change-rate reactive power control parameter $Q_{DER\_dfdt}$ as described above, and transmits the parameters from the communication unit 51 to each distributed-power-source control apparatus 6. The output duration time $T_{out}$ and the output decrease time $T_{decrease}$ are also parameters of the f-change-rate control and the f-change-rate reactive power control, but these two parameters do not necessarily need to be changed according to the magnitude of the system disturbance. That is, the output duration time $T_{out}$ and the output decrease time $T_{decrease}$ may be constant values without changing according to the detected f change rate.

In the f-change-rate control and the f-change-rate reactive power control, the output duration time $T_{out}$ and the output decrease time $T_{decrease}$ may be set to different values. In general, it is not desirable from the viewpoint of the voltage management of the system that the voltage of the system greatly fluctuates by the reactive power control. However, a short-time voltage fluctuation is considered to be acceptable because it has little influence on other voltage controllers. From such a viewpoint, for example, the output duration time $T_{out}$ in the f-change-rate reactive power control may be set to about several seconds, and the output decrease time $T_{decrease}$ may be set to a sufficiently small value.

As described above, the distributed-power-source control apparatus 6C receives the f-change-rate control parameter and the f-change-rate reactive power control parameter that are determined by the central operation unit 5C using the communication unit 602, and stores the received parameters in the f-change-rate control parameter storage unit 606 and the f-change-rate reactive power control parameter storage unit 613, respectively. When the system disturbance is generated, the distributed-power-source control apparatus 6C detects the steep frequency change using the f-change-rate measurement unit 604. Then, the distributed-power-source control apparatus 6C calculates the active power output $P_{DER\_dfdt}$ of the distributed power source 7 in the f-change-rate controlled variable operation unit 605 based on the f-change-rate control parameter stored in the f-change-rate control parameter storage unit 606. In addition, the distributed-power-source control apparatus 6C calculates the reactive power output $Q_{DER\_dfdt}$ of the distributed power source 7 in the f-change-rate reactive power controlled variable operation unit 612 based on the f-change-rate reactive power control parameter stored in the f-change-rate reactive power control parameter storage unit 613. Then, the power converter 601 continues the active power output or the reactive power output for the output duration time $T_{out}$ at $P_{DER\_dfdt}$, and then performs the control to decrease the active power output or the reactive power output to zero for the output decrease time $T_{decrease}$. The distributed-power-source control apparatus 6C may prioritize the control of the active power output when the distributed power source 7 has the active power control capability, and may prioritize the control of the reactive power output when the distributed power source 7*c* does not have the active power control capability.

Figure 24:
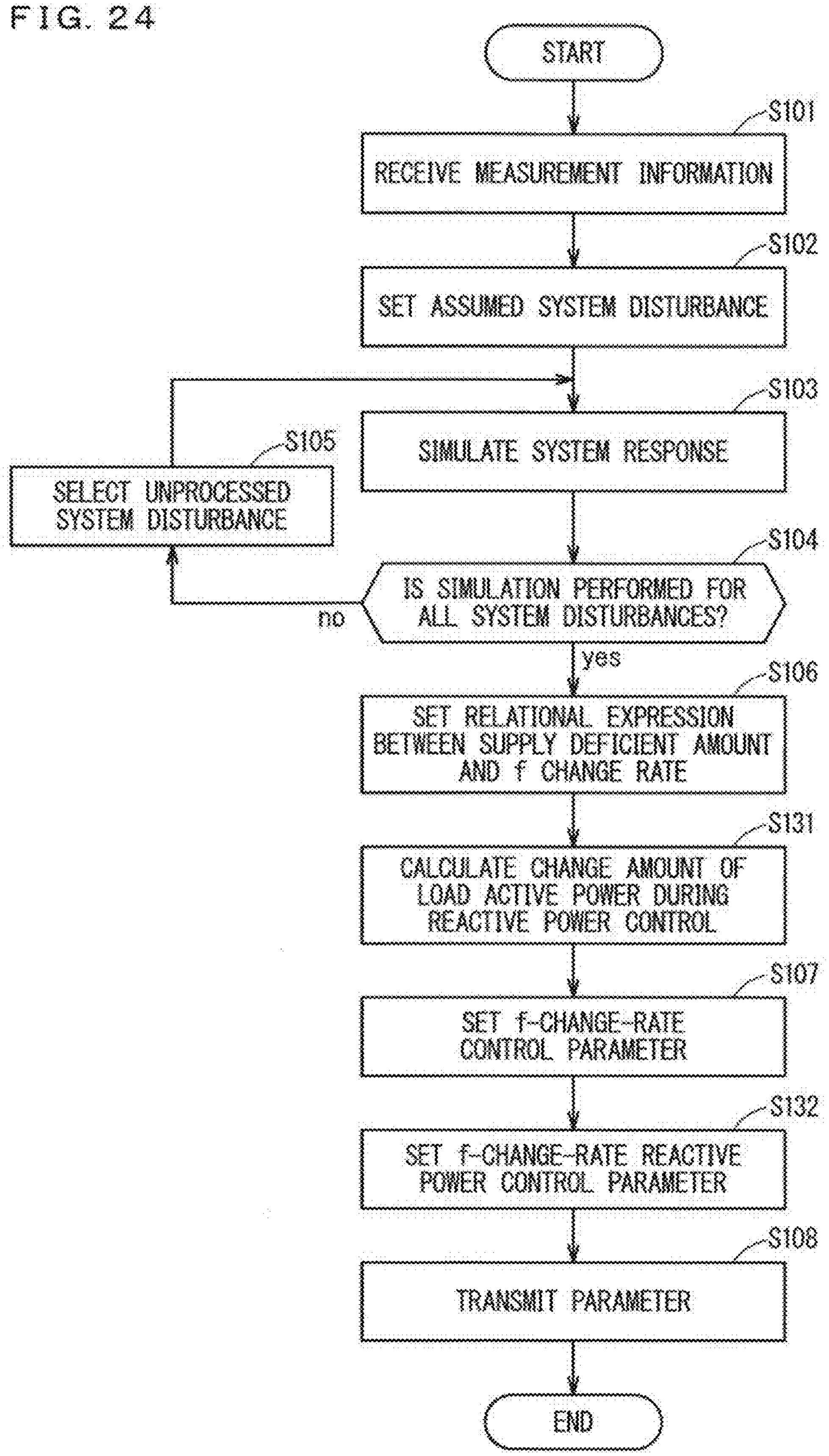
FIG. 24 is a flowchart illustrating processing for determining parameters of frequency change rate control and the frequency-change-rate reactive power control by the central operation unit of the fourth embodiment.

FIG. 24 is a flowchart illustrating processing for determining the f-change-rate control parameter and the f-change-rate reactive power control parameter by the central operation unit 5C. The flowchart in FIG. 24 is obtained by adding step S131 between step S106 and step S107 and adding step S132 between step S107 and step S108 in the flowchart illustrating the processing for determining the parameter of the f-change-rate control by the central operation unit 5 of the first embodiment in FIG. 9.

In step S106, the f-change-rate control parameter operation unit 56 sets a relational expression between the supply deficient amount $\Delta P_{missmatch}$ generated by the disturbance and the f change rate calculated therefor from the simulation result of the system disturbance. Thereafter, in step S131, the f-change-rate reactive power control parameter operation unit 59 calculates the change amount of the active power of the load 3 when the distributed-power-source control apparatus 6C performs the reactive power control by the above-described method.

Thereafter, in step S107, the f-change-rate control parameter operation unit 56 sets the active power output $P_{DER\_dfdt}$, the output duration time $T_{out}$, and the output decrease time $T_{decrease}$, which are f-change-rate control parameters, based on the relational expression set in step S106.

Subsequently, in step S132, the f-change-rate reactive power control parameter operation unit 59 sets the f-change-rate reactive power control parameter using the above-described method. The f-change-rate reactive power control parameter includes a correspondence relation between the reactive power to be output from the distributed power source 7 to the transmission and distribution system 1 and the f change rate in the transmission and distribution system 1, the output duration time $T_{out}$, and the output decrease time $T_{decrease}$.

The assumed accident of the power system and the f-change-rate control parameter and the f-change-rate reactive power control parameter to be determined change depending on the state of the transmission and distribution system 1, for example, the driving state of the large-scale generator 2, the size of the load 3, the voltage and power flow state, and the like. Consequently, the central operation unit 5C may repeatedly perform the processing of the flowchart in FIG. 24 at a constant period. The execution period is arbitrary, but for example, may be about 30 minutes in view of the fact that the start and stop plan of the large-scale generator 2 is determined every about 30 minutes. Accordingly, the current state of the transmission and distribution system 1 can be reflected in the f-change-rate control parameter and the f-change-rate reactive power control parameter.

D-3. Effect

In the distributed-power-source control system 4 of the fourth embodiment, the central operation unit 5C includes the f-change-rate reactive power control parameter operation unit 59 that calculates, as the f-change-rate reactive power control parameter, the correspondence relation between the f change rate in the transmission and distribution system 1 and the reactive power to be output from the distributed power source 7 to the transmission and distribution system 1 based on the correspondence relation between the f change rate in the transmission and distribution system 1 and the supply power deficient amount of the active power. The distributed-power-source control apparatus 6C includes the f-change-rate reactive power controlled variable operation unit 612 that sets the reactive power corresponding to the f change rate of the own terminal in the f-change-rate reactive power control parameter as the f-change-rate reactive power controlled variable. The power converter 601 controls the active power output from the distributed power source 7 to the transmission and distribution system based on the f-change-rate reactive power controlled variable. With the above configuration, in the distributed-power-source control system 4 of the fourth embodiment, because the distributed-power-source control apparatus 6C controls the reactive power of the distributed power source 7, even the distributed power source 7 having no active power control capability can contribute to the improvement of the frequency stability of the transmission and distribution system 1.

E. Hardware Configuration

Figure 25:
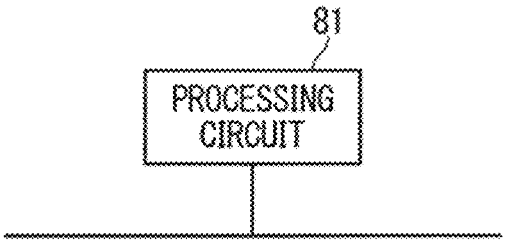
FIG. 25 is a view illustrating a hardware configuration of the central operation unit and the distributed-power-source control apparatus.

The central operation units 5, 5A, 5B, 5C and the distributed-power-source control apparatuses 6, 6A, 6B, 6C described above are implemented by a processing circuit 81 in FIG. 25. That is, the processing circuit 81 includes components of the central operation units 5, 5A, 5B, 5C and the distributed-power-source control apparatuses 6, 6A, 6B, 6C. Dedicated hardware may be applied to the processing circuit 81, or a processor that executes a program stored in a memory may be applied. For example, the processor is a central processing unit, a processing unit, an operation unit, a microprocessor, a microcomputer, a digital signal processor (DSP), or the like.

In the case where the processing circuit 81 is dedicated hardware, for example, the processing circuit 81 corresponds to a single circuit, a composite circuit, a programmed processor, a parallel programmed processor, an application specific integrated circuit (ASIC), a field-programmable gate array (FPGA), or a combination thereof. The functions of the units such as units may be implemented by a plurality of processing circuits 81, or the functions of the units may be collectively implemented by one processing circuit.

Figure 26:
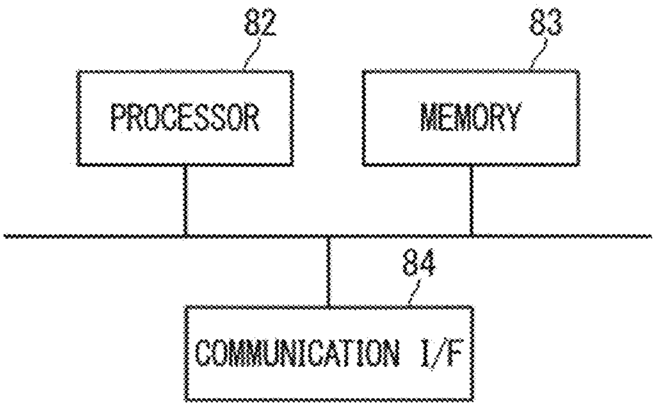
FIG. 26 is a view illustrating the hardware configuration of the central operation unit and the distributed-power-source control apparatus.

When the processing circuit 81 is a processor, the functions of the components of the central operation units 5, 5A, 5B, 5C and the distributed-power-source control apparatuses 6, 6A, 6B, 6C are implemented by a combination with software or the like (software, firmware, or software and firmware). Software and the like are described as programs and stored in a memory. As illustrated in FIG. 26, a processor 82 applied to the processing circuit 81 reads and executes the program stored in a memory 83, thereby implementing the functions of the respective units. The communication unit 51 of the central operation units 5, 5A, 5B, 5C and the communication unit 602 of the distributed-power-source control apparatuses 6, 6A, 6B, 6C are implemented by a communication I/F 84. That is, when are executed by the processing circuit 81, the central operation units 5, 5A, 5B, 5C and the distributed-power-source control apparatuses 6, 6A, 6B, 6C include the memory 83 that stores programs that result in execution of the respective processes of the central operation units 5, 5A, 5B, 5C and the distributed-power-source control apparatuses 6, 6A, 6B, 6C. In other words, it can also be said that this program causes a computer to execute each process of the central operation units 5, 5A, 5B, 5C and the distributed-power-source control apparatuses 6, 6A, 6B, 6C. At this point, the memory 83 may be a nonvolatile or volatile semiconductor memory such as a random access memory (RAM), a read only memory (ROM), a flash memory, an erasable programmable read only memory (EPROM), or an electrically erasable programmable read only memory (EEPROM), a hard disk drive (HDD), a magnetic disk, a flexible disk, an optical disk, a compact disk, a mini disk, a digital versatile disk (DVD), a drive apparatus thereof, or the like, or any storage medium to be used in the future.

The configuration in which the functions of the central operation units 5, 5A, 5B, 5C and the distributed-power-source control apparatuses 6, 6A, 6B, 6C are implemented by any one of hardware, software, and the like has been described above. However, the present invention is not limited thereto, and a part of the functions of the central operation units 5, 5A, 5B, 5C and the distributed-power-source control apparatuses 6, 6A, 6B, 6C may be implemented by dedicated hardware, and another part thereof may be implemented by software or the like.

As described above, the processing circuit 81 can implement the above-described functions by hardware, software, or the like, or a combination thereof. The storage unit 52, the f-change-rate control parameter storage unit 606, the Δf control parameter storage unit 609, and the f-change-rate reactive power control parameter storage unit 613 are configured by the memory 83.

The embodiments can be freely combined, and the embodiments can be appropriately modified or omitted. The above description is exemplary in all aspects. It is understood that numerous modifications not illustrated can be assumed.

EXPLANATION OF REFERENCE SIGNS

1 transmission and distribution system, 2 large scale generator, 3 load, 4 distributed-power-source control system, 5, 5A, 5B, 5C central operation unit, 6, 6A, 6B, 6C distributed-power-source control apparatus, 7 distributed power source, 8 measurement apparatus, 51 communication unit, 52 storage unit, 53 information setting unit, 54 disturbance setting unit, 55 response operation unit, 56 f-change-rate control parameter operation unit, 57 Δf control parameter operation unit, 58 correction controlled variable operation unit, 59 f-change-rate reactive power control parameter operation unit, 81 processing circuit, 82 processor, 83 memory, 84 communication I/F, 601 power converter, 602 communication unit, 603 driving state measurement unit, 604 f-change-rate measurement unit, 605 f-change-rate controlled variable operation unit, 606 f-change-rate control parameter storage unit, 607 Δf measurement unit, 608 Δf controlled variable operation unit, 609 Δf control parameter storage unit, 610 coordination unit, 611 correction controlled variable setting unit, 612 f-change-rate reactive power controlled variable operation unit, 613 f-change-rate reactive power control parameter storage unit

The invention claimed is:

1. A distributed-power-source control system comprising:

a distributed-power-source control apparatus that controls output power from a distributed power source to a transmission and distribution system; and a central operation unit that sets a parameter used for control by the distributed-power-source control apparatus, wherein the central operation unit includes first circuitry that simulates response of the transmission and distribution system at time of generation of disturbance in the transmission and distribution system, and obtains, from a simulation result, a correspondence relation between an f change rate, which is a frequency change rate in the transmission and distribution system, and a supply power deficient amount of active power, and calculates a correspondence relation between the f change rate in the transmission and distribution system and active power to be output from the distributed power source to the transmission and distribution system as an f-change-rate control parameter, based on the correspondence relation between the f change rate in the transmission and distribution system and the supply power deficient amount of the active power, and the distributed-power-source control apparatus includes second circuitry that measures an f change rate of an own terminal, and sets active power corresponding to the f change rate of the own terminal in the f-change-rate control parameter as an f-change-rate controlled variable, and a power converter that controls active power output from the distributed power source to the transmission and distribution system, based on an active power controlled variable determined based on the f-change-rate controlled variable.

2. The distributed-power-source control system according to claim 1, wherein the first circuitry simulates a response of the transmission and distribution system with respect to disturbance of a plurality of cases, and expresses the correspondence relation between the f change rate in the transmission and distribution system and the supply power deficient amount of the active power, using an approximate relational expression.

3. The distributed-power-source control system according to claim 1, wherein, when disturbance of the transmission and distribution system is generated, the power converter sets the active power output from the distributed power source to the transmission and distribution system as the active power controlled variable for a certain time and then decreases the active power controlled variable for a certain time.

4. The distributed-power-source control system according to claim 1, wherein the first circuitry calculates, as a Δf control parameter, a correspondence relation between Δf that is a deviation of a frequency in the transmission and distribution system from a reference frequency and the active power to be output from the distributed power source to the transmission and distribution system, the second circuitry calculates a supply deficient amount of the active power corresponding to the f change rate of the own terminal as a Δf controlled variable in the f-change-rate control parameter, and the active power controlled variable is determined based on the f-change-rate controlled variable and the Δf controlled variable.

5. The distributed-power-source control system according to claim 4, wherein the active power controlled variable is either of the f-change-rate controlled variable and the Δf controlled variable, whichever has a larger absolute value, when the f-change-rate controlled variable and the Δf controlled variable have an identical sign, and the active power controlled variable is a sum of the f-change-rate controlled variable and the Δf controlled variable when the f-change-rate controlled variable and the Δf controlled variable have different signs.

6. The distributed-power-source control system according to claim 1, wherein the first circuitry calculates a supply deficient amount of active power generated in the transmission and distribution system when disturbance is generated, and calculate, as a correction controlled variable, active power to be output to the transmission and distribution system by the distributed power source based on the supply deficient amount of the active power generated in the transmission and distribution system, and the active power controlled variable is determined based on the f-change-rate controlled variable and the correction controlled variable.

7. The distributed-power-source control system according to claim 6, wherein the active power controlled variable is either of the f-change-rate controlled variable and the correction controlled variable, whichever has a larger absolute value, when the f-change-rate controlled variable and the correction controlled variable have an identical sign, and the active power controlled variable is a sum of the f-change-rate controlled variable and the correction controlled variable when the f-change-rate controlled variable and the correction controlled variable have different signs.

8. The distributed-power-source control system according to claim 1, wherein the first circuitry calculates, as an f-change-rate reactive power control parameter, a correspondence relation between the f change rate in the transmission and distribution system and reactive power to be output from the distributed power source to the transmission and distribution system, based on the correspondence relation between the f change rate in the transmission and distribution system and the supply power deficient amount of the active power, the second circuitry sets reactive power corresponding to the f change rate of the own terminal in the f-change-rate reactive power control parameter as an f-change-rate reactive power controlled variable, and the power converter controls the active power output from the distributed power source to the transmission and distribution system based on the f-change-rate reactive power controlled variable.

9. The distributed-power-source control system according to claim 8, wherein the second circuitry calculates the f-change-rate reactive power control parameter based on the correspondence relation between the f change rate in the transmission and distribution system and the supply power deficient amount of the active power and load power change sensitivity expressing how much load active power of the transmission and distribution system changes according to a change in reactive power of the distributed power source.

10. The distributed-power-source control system according to claim 9, wherein the second circuitry calculates the load power change sensitivity by simulating a change in the load active power at time of changing reactive power output of the distributed power source.

11. The distributed-power-source control system according to claim 9, wherein the second circuitry calculates the load power change sensitivity using an inverse matrix of a Jacobian matrix of a power flow equation.

12. The distributed-power-source control system according to claim 8, wherein, when disturbance of the transmission and distribution system is generated, the power converter sets the reactive power output from the distributed power source to the transmission and distribution system as the f-change-rate reactive power controlled variable for a certain time and then decreases the f-change-rate reactive power controlled variable for a certain time.

* * * * *